United States Patent [19]

Rochelle et al.

[11] Patent Number: 5,047,222

[45] Date of Patent: * Sep. 10, 1991

[54] PROCESS FOR REMOVING SULFUR FROM SULFUR-CONTAINING GASES: HIGH CALCIUM FLY-ASH

[75] Inventors: Gary T. Rochelle, Austin, Tex.; John C. S. Chang, Cary, N.C.

[73] Assignee: Board of Regents, The University of Texas System, Austin, Tex.

[*] Notice: The portion of the term of this patent subsequent to Feb. 14, 2006 has been disclaimed.

[21] Appl. No.: 449,089

[22] Filed: Dec. 8, 1989

Related U.S. Application Data

[63] Continuation of Ser. No. 156,856, Feb. 17, 1988, abandoned, which is a continuation-in-part of Ser. No. 939,171, Nov. 10, 1986, abandoned, and Ser. No. 928,337, Nov. 17, 1986, Pat. No. 4,804,521.

[51] Int. Cl.$^5$ .......................... B01J 8/00; C01B 17/00
[52] U.S. Cl. ..................................... 423/242; 423/244
[58] Field of Search .......... 423/242 A, 242 R, 244 A, 423/244 R

[56] References Cited

U.S. PATENT DOCUMENTS

| | | | |
|---|---|---|---|
| 3,131,024 | 4/1964 | Leineweber | 23/110 |
| 3,264,130 | 8/1966 | Mays et al. | 106/292 |
| 3,861,935 | 1/1975 | Ohnemuller et al. | 106/306 |
| 3,906,079 | 9/1975 | Tamaki et al. | 423/242 |
| 3,988,419 | 10/1976 | Mori | 423/155 |
| 4,073,864 | 2/1978 | Atsukawa et al. | 423/242 |
| 4,279,873 | 7/1981 | Felsvang et al. | 423/242 |
| 4,314,980 | 2/1982 | Shen et al. | 423/331 |
| 4,555,392 | 11/1985 | Steinberg | 423/244 |
| 4,602,918 | 7/1986 | Steinberg et al. | 44/51 |
| 4,636,370 | 1/1987 | Dean et al. | 423/235 |
| 4,636,371 | 1/1987 | Farha, Jr. | 423/244 |
| 4,640,825 | 2/1987 | Rosenberg | 423/235 |
| 4,642,225 | 2/1987 | Leikert | 423/244 |
| 4,645,449 | 2/1987 | Schwartz et al. | 431/8 |
| 4,645,652 | 2/1987 | Kimura | 423/235 |
| 4,645,653 | 2/1987 | Kimura | 423/235 |
| 4,645,654 | 2/1987 | Barczak | 423/244 |

FOREIGN PATENT DOCUMENTS 62-213842 9/1987 Japan.
396969 8/1933 United Kingdom.

OTHER PUBLICATIONS

Jozewicz et al. (1987) Proceedings: Tenth Symposium on Flu Gas Desulfurization, Atlanta, Ga., Nov. 1986, vol. 2, pp. 9-123 through 9-144.

Josewicz et al., (1986), *Environ. Prog.*, 5:218.

J. He et al., "Comparison of Tuff and Fly Ash in Blended Cement", 64 *Am. Ceram. Soc. Bulletin*, No. 5 (1985), at 707-711.

G. D. Reed et al., "Analysis of Coal Fly Ash Properties of Importance to Sulfur Dioxide Reactivity Potential", 18 *Environ. Sci. Technol.*, No. 7 (1984), at 548-552.

S. L. Marusin, "Experimental Examination of Fly Ash Concrete", 6 Cement, Concrete, and Aggregates, CCAGDP, No. 6 (Winter 1984), at 126-136.

(List continued on next page.)

Primary Examiner—Gregory A. Heller
Attorney, Agent, or Firm—Arnold, White & Durkee

[57] ABSTRACT

The present disclosure relates to improved processes for treating hot sulfur-containing flue gas to remove sulfur therefrom. Processes in accordance with the present invention include preparing an aqueous slurry composed of a calcium alkali source and a source of reactive silica and/or alumina, heating the slurry to above-ambient temperatures for a period of time in order to facilitate the formation of sulfur-absorbing calcium silicates or aluminates, and treating the gas with the heat-treated slurry components. Examples disclosed herein demonstrate the utility of these processes in achieving improved sulfur-absorbing capabilities. Additionally, disclosure is provided which illustrates preferred configurations for employing the present processes both as a dry sorbent injection and for use in conjunction with a spray dryer and/or bagfilter. Retrofit application to existing systems is also addressed.

18 Claims, 4 Drawing Sheets

Temper Embrittlement

OTHER PUBLICATIONS

M. W. Grutzeck et al., "Mechanism of Hydration of Condensed Silica Fume in Calcium Hydroxide Solutions" (1984), at 643-664.

P. J. Sereda et al., "Structure Formation and Development in Hardened Cement Pastes" (1980).

Yant et al. (1979), *AIChE J.*, 25:811.

F. A. Ayer, "Proceedings: Symposium on Flue Gas Desulfurization Hollywood, Fla., Nov. 1977 (vol. 1)", EPA-600/7-78-058a (Mar. 1978) at 278-291.

H. F. W. Taylor, "Chapter 5: The Calcium Silicate Hydrates", 1 The Chemistry of Cements 167-232 (1964).

S. Brunauer, "Tobermorite Gel—The Heart of Concrete", 50 American Scientist 210-229 (1962).

S. A. Greenberg et al., "Investigation of Colloidal Hydrated Calcium Silicates. I. Solubility Products", 64 *J. Phys. Chem.*, 1151-1157 (Sep. 1960).

L. Kalousek, "Tobermorite and Related Phases in the System $CaO-SiO_2-H_2O$", *J. Amer. Concrete Inst.* (Jun. 1955), at 989-1011.

L. Heller et al., "Hydrated Calcium Silicates. Part II. Hydrothermal Reactions: Lime:Silica Ration 1:1", *Chemical Society Journal* (1951), at 2397-2401.

H. F. W. Taylor, "Hydrated Calcium Silicates. Part I. Compound Formation at Ordinary Temperatures", *Chemical Society Journal* (1950) at 3682-3690.

H. H. Steinour, "The System $CaO-SiO_2-H_2O$ and the Hydration of the Calcium Silicates", *Chem. Reviews* (1947), at 391-459.

A. B. Cummins et al., "Diatomaceous Earth: Equilibrium and Rate of Reaction in the System Hydrated Lime-Diatomaceous Silica-Water", 26 Industrial and Engineering Chemistry, No. 6 (1934), at 688-693.

Dialog Search Report.

G. Rochelle and P. Chu, "$SO_2/NO_2$ Removal By Ca-$(OH)_2$", (Oct. 16, 1986).

J. Peterson, "Kinetic Study of the Reaction: Fly Ash+$Ca(OH)_2$", (Oct. 21, 1986).

J. Peterson and G. Rochelle, "Kinetic Study of the Reaction: $Ca(OH)_2$+Fly Ash" (Apr. 14, 1987).

J. Peterson and G. T. Rochelle, "Calcium Silicate Reagents for Dry Flue Gas Desulfurization" (Oct. 14, 1987).

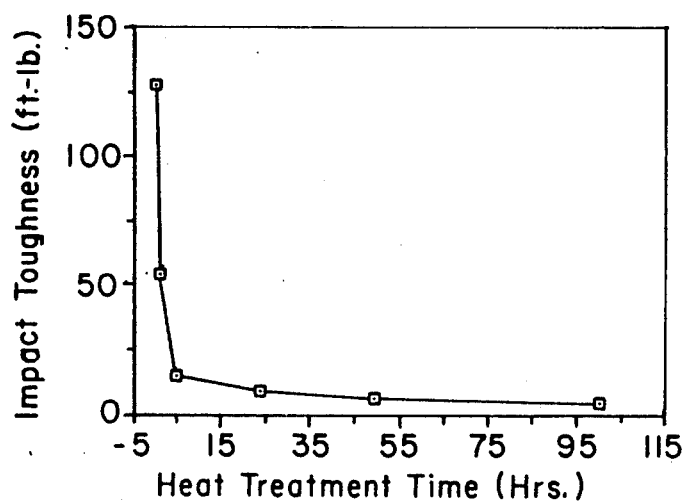
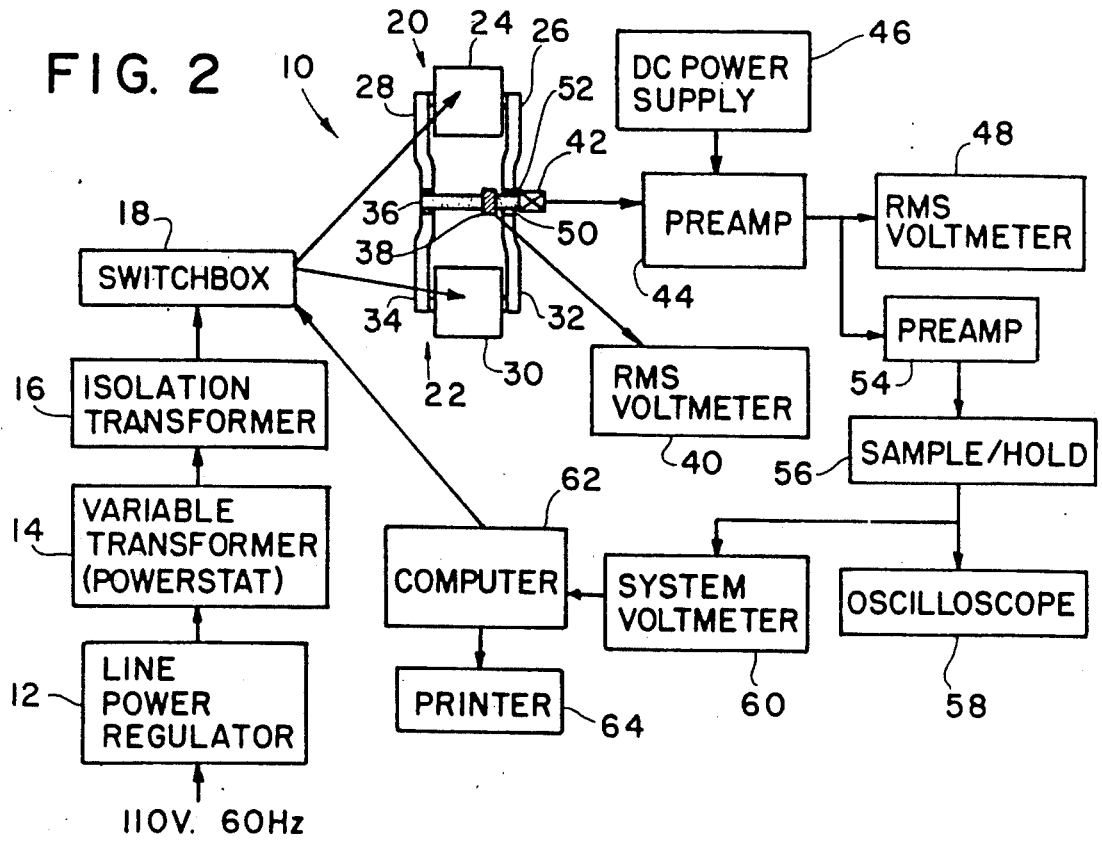

Unembrittled

Embrittled

Unembrittled

Embrittled

PROCESS FOR REMOVING SULFUR FROM SULFUR-CONTAINING GASES: HIGH CALCIUM FLY-ASH

The government may own certain rights in the present invention pursuant to DOE grant DE-FG22—85PC 81006 and EPA contract 68—02—3988.

This application is a continuation of application Ser. No. 156,856, filed on Feb. 17, 1988, now abandoned which is a continuation-in-part of Ser. No. 939,171, filed Nov. 10, 1986, now abandoned and Ser. No. 928,337, filed Nov. 7, 1986, now U.S. Pat. No. 4,804,521.

BACKGROUND OF THE INVENTION

Reference is made under 35 U.S.C. SS120 to copending applications, U.S. Ser. No. 939,171 filed Nov. 10, 1986, and U.S. Ser. No. 928,337, filed Nov. 7, 1986 now U.S. Pat. No. 4,804,521. These disclosures are incorporated herein by reference.

1. Field of the Invention

The present invention relates to processes for reducing the level of sulfur in a sulfur-containing gas. In particular, the invention relates to the use of improved sulfur dioxide-sorbent calcium alkali slurries, which include a calcium-reactive alumina or silica source, in the desulfurization of sulfur-containing flue gases, and methods for improving the sulfur dioxide absorbing capabilities of such slurries.

2. Description of the Related Art

Coal represents one of the most bountiful sources of energy in the world today. For example, it has been estimated that the known coal reserves in the U.S. alone could supply sufficient energy for domestic consumption for several hundred years. Unfortunately much of this coal contains high levels of sulfur which, when the coal is burned, is released into the atmosphere, generally in the form of sulfur dioxide. One of the most serious environmental problems associated with such sulfur emissions is the generation of atmospheric sulfuric acid, resulting in so-called "acid rain."

Attempts at controlling sulfur dioxide emissions from coal burning plants have led to the development of a number of advanced systems and processes for flue gas desulfurization. Fluidized-bed combustion, lime injection, and flue gas desulfurization are some of the examples. In these processes, limestone has been used as a sorbent which forms primarily calcium sulfate at a temperature above 700° C. Regeneration of the sorbent has been a difficult problem because of the high chemical stability of the sulfate. Yet, regeneration is desirable from the points of view of conservation, cost, and ecology. As a result, a considerable amount of research effort has been expended in developing alternate sorbents which are regenerative as well as reactive to sulfur dioxide.

Fluidized bed combustion (FBC) and scrubbers for flue gas desulurization (FGD) represent two of the more promising advanced processes for power generation. FBC relates to the combustion of coal with limestone particles as the bed material, and has received increasing attention as a promising and versatile technology for clean power generation. Equally promising has been FGD, wherein sulfurreactive sorbents are employed to remove sulfur from flue gases prior to their venting into the atmosphere. In developing the technologies for FBC and FGD, a search for sorbents more effective than limestone, especially ones which are economically regenerative, has been a challenging task.

Flue gas desulfurization by the means of spray dryer absorber and bag filter or electrostatic precipitator has recently received much attention. In the spray dryer/bag filter system, flue gas is contacted with a fine spray of an aqueous solution or slurry of a reactive alkali (typically lime), with $SO_2$ removal and drying occurring simultaneously. The sulfur dioxide is absorbed into the water droplet during the constant rate period of drying until it shrinks to the extent that the particles touch each other. During the following falling rate period, the remaining water diffuses through the pores of agglomerated particles until the solids establish pseudo-equilibrium with the humid environment of spray dryer.

The third stage of drying may be called the second-falling rate period. Any drying/mass transfer during this period is limited by the diffusion of moisture from within tightly packed particles. The first two stages take place exclusively in the spray dryer. The majority of pseudoequilibrium period occurs in the duct joining spray dryer and bag filter and in the bag filter itself. Since not all moisture is removed from the solids in the spray dryer, the remaining moisture promotes further removal of $SO_2$ in the bag filter. Therefore the total $SO_2$ removal in the system is a sum of removal in the spray dryer and bag filter.

The recycle of product solids is among the options that have been tested to increase the utilization of reagent. Reports indicate that recycle of product solids and fly ash results in improvement of reagent utilization and $SO_2$ removal. This option provides a higher $Ca(OH)_2$ concentration in the slurry feed at the same $Ca(OH)_2$ stoichiometry (moles of $Ca(OH)_2$ fed to the system/moles of $SO_{02}$ in the feed gas). In one pilot plant, increasing the recycle ration (g solids recycled/g fresh $Ca(OH)_2$) from 6:1 to 12:1 increased $SO_2$ removal in the spray dryer from 70% to 80% at stoichiometry 1.0 (Blythe et al., 1983, *Proceedings: Symposium or Flue Gas Desulfurization*, Vol. 2, NTIS PB84—110576). In another installation, compared to once-thru tests, recycle tests gave 10 to 15% more $SO_2$ removal at stoichiometry 1.5 (Jankura et al., presented at the *Eighth EPA/EPRI Symposium on Flue Gas Desulfurization*, New Orleans, LA, 1983).

Another option enhancing lime utilization uses the recycle of both solids captured downstream in the spray dryer and solids from the baghouse. However, removal does not appear to be significantly different when either spray dryer solids or fabric filter solids are employed as the recycled material. At stoichiometry 1.0 the removal increased from 53% when no recycle was employed to 62% with 0.5:1 recycle ration. When ash content in the feed slurry increased from 5% to 20%, $SO_2$ removal in the spray dryer increased from 80% to 92% for stoichiometry 1.6 (Jankura et al., 1983).

U.S. Pat. No. 4,279,873, to Felsvang et al., relates several experiments investigating the effects of fly ash recycle and proved it to be beneficial for $SO_2$ removal in a spray dryer. It was found that substantially higher removal of $SO_2$ may be achieved when recycling the fly ash and $Ca(OH)_2$ than when recycling $Ca(OH)_2$ alone. Corresponding efficiencies for stoichiometry 1.4, 500 ppm inlet $SO_2$, and comparable solids concentration were 84% and 76%, respectively. For the same stoichiometry and $SO_2$ concentration, removal was only 67% for the simple oncethru process. At low $SO_2$ concentration and high recycle rations, over 90% removal was achieved even at extremely low stoichiometries. At 548 ppm $SO_2$, 25:1 recycle, 0.76 stoichiometry and at 170 ppm $SO_2$, 110:1 recycle, 0.39 stoichiometry, $SO_2$ removal was 93.8% and 97.8%, respectively.

Removal efficiencies up to 65% were reported with a slurry of highly alkaline (20% CaO) fly ash only (Hurst and Bielawski, *Proceedings: Symposium on FGD*, EPA-600/9-81-019,853-860, 1980). In another experiment, 25% $SO_2$ removal was achieved when spraying slurried fly ash collected from a boiler burning 3.1% sulfur coal (Yeh et al., Proceedings: Symposium on Flue Gas Desulfurization, EPRI CS-2897, 821-840, 1983). A weak trend was found in a study of 22 samples of fly ashes that a slurry with a higher total slurry alkalinity tended to have a higher $SO_2$ capture (Reed et al., *Environ. Sci. Technol.*, 18, 548-552, 1984).

Therefore, while it is clear that desulfurization processes employing flue gas scrubbers represents an important advance, it is equally clear that such techniques presently have economic and technical drawbacks, not the least of which is the low degree of reagent utilization. While recycle of product solids with fly ash has resulted in some improvement, such processes are still not economically feasible for certain applications, and much room remains for the improvement of reagent utilization in such systems.

SUMMARY OF THE INVENTION

Accordingly, the present invention is directed to improved processes for reducing the level of sulfur in a sulfur-containing gas which in their most general and overall scope include four basic steps. One step involves the preparation of an aqueous slurry comprising a calcium alkali together with a calcium-reactive silica or alumina which are present in amounts sufficient to allow for the formation of a sulfur dioxide-absorbing component which includes a calcium silicate or calcium aluminate. Virtually any composition which includes a calcium alkali (CaO or $Ca(OH)_2$) may be employed in the practice of the present invention. For example, calcium alkali in the form of lime, slaked lime, hydrated lime, calcidic lime, dolomitic lime, calcium hydroxide or calcium oxide may be employed. For economic reasons, due to its lower cost, a preferred embodiment of the present invention employs lime or slaked lime.

Similarly, virtually any composition which includes a calcium reactive silica or alumina may be employed, wherein a calcium-reactive silica or alumina is defined as a source of silica or alumina which is readily soluble in alkaline solutions. Such compositions include, but are not limited to, fly ash, diatomaceous earth, clay, bentonite, montmorillonite, activated alumina, or silicic acid. Again, for economic reasons, one would generally employ fly ash in that fly ash is a natural by-product of coal combustion and is therefore readily available at coal burning power plants. Thus, fly ash may be included in the slurry in the form of spent solids.

Although some degree of sulfur absorption may be obtained with slurries which contain virtually any mass ratio of calcium reactive silica or alumina to calcium alkali, in one embodiment, mass ratios ranging from about 1:1 to about 16:1, respectively, are preferred. In a more preferred embodiment, the slurry comprises a mass ratio of calcium reactive silica or alumina to calcium alkali from about 1:1 to about 5:1, respectively.

As with mass ratio, the total amount of solids which are slurried is not of critical importance. However, the total solids amount will generally be determinative of the amount of sulfur which is removed from the gas by the slurry. Typically, about one to three moles of calcium alkali is added for every mole of sulfur to be removed from the gas. However, in a more preferred embodiment, the slurry comprises about one to two moles of calcium alkali for every mole of sulfur to be removed from the gas.

In a further embodiment, the slurry also includes sodium hydroxide in a concentration ranging from about 0.03 molar to about 1 molar. More preferably, the slurry comprises about 0.05 to about 0.5 molar sodium hydroxide. Even more preferably, the slurry comprises sodium hydroxide in a concentration ranging from about 0.1 molar to about 0.25 molar. Therefore, typically, the slurry will comprise about 0.02 to 0.3 moles of sodium hydroxide for every mole of calcium alkali. Or more preferably, 0.05 to 0.2 moles of sodium hydroxide for every mole of calcium alkali.

Another step of the most general process of the present invention involves heating the slurry to a temperature above ambient in a manner to facilitate the formation of the sulfur dioxide-absorbing component. Virtually any increase in temperature of the slurry over ambient, as well as increases in slurrying time, will result in an improved sulfur dioxide absorbing slurry. The upper temperature limit is bounded only by temperatures at which the calcium reactive silicates or aluminates will become dehydrated. Generally, such dehydration will occur at temperatures approaching 200° centigrade. It is believed that dehydrated calcium silicates or aluminates will not prove as advantageous in sulfur absorption as hydrated calcium silicates or aluminates. Moreover, extremely high slurrying temperatures (for example, above 200° C.) will generally prove to be uneconomic in commercial practice.

Therefore, in a preferred embodiment, the slurry is heated to between about 40° and about 100° C. for between about 0.5 and about 48 hours. In one embodiment, the slurry is heated to between about 40° and about 60° C. for between about 2 and about 36 hours. More preferably, the slurry is heated for between about 4 to about 12 hours. In another embodiment, the slurry is heated to between 60° and about 80° C. for between about 1 and about 24 hours. More preferably, the slurry is heated at such temperatures for between about 2 and about 12 hours. In still another embodiment, the slurry is heated to between about 80° and about 100° C. for between about 0.5 and 12 hours. More preferably, the slurry is heated to such temperatures for between about 1 and about 8 hours.

Thus, it has been noted, that the temperature to which the slurry is heated and maintained is inversely proportional to the amount of time necessary to obtain highly sulfur-reactive calcium silicates and aluminates.

Another step of the most general process requires contacting gas with the heat-treated slurry in a manner sufficient to allow for absorption of sulfur-dioxide by the absorbing component. Numerous embodiments are known in the art for performing such a contacting step. In a preferred embodiment, the contacting step includes atomizing the slurry into a stream of the sulfur-containing gas, drying the resulting atomized droplets so as to form a gas/solid suspension having a gaseous component and a solid component which solid component includes the sulfur-dioxide-absorbing component, and retaining the gaseous and solid components in contact in a manner sufficient to allow for the absorption of the sulfur dioxide by the absorbing component.

In one embodiment, the contacting steps further includes directing the gas/solid suspension onto a reaction surface to allow for deposition of the solid component onto the surface, and passing the suspension over the deposited solid component in order to: 1) further effect absorption of the sulfur-dioxide by the absorbing component, 2) effect a separation of the gas from the solid component and, 3) further effect a drying of the solid component. Typically, the reaction surface will include a bagfilter. However, in certain embodiments which do not employ a bagfilter, the process includes carrying the gas/solid suspension in a stream to allow for substantial contact between the gaseous and solid component and separating the solid component from the gas by means of an electrostatic precipitator or cyclones. Therefore, the bagfilter, electrostatic precipitator and cyclone offer alternative means for separating sulfurabsorbed solids from the gas. However, as will be appreciated, the bagfilter alternative offers the additional benefit of providing a reaction surface particularly well adapted to the practice of the present invention.

Due to economic and other considerations, one should typically employ a recycling of a portion of the sulfurabsorbed solids back to the aqueous slurry. This will achieve not only a partial regeneration of the sulfur absorbed solids but will also improve the performance, and economics, of the process. Therefore, the process can be seen as a cyclical process wherein a portion of sulfur absorbed solids are recycled to form a slurry which includes an admixture of sulfur absorbed solids and the calcium alkali. Since flue gas itself will typically contain sufficient fly ash content, there is generally no need to add fly ash directly to the slurry, it being added in the form of spent solids.

In a process embodiment directed primarily to dry injection technology, the steps of preparing an aqueous slurry, and heating the slurry, are the same as in the general overall embodiment. However, following heating of the slurry, for dry injection purposes, the slurry is dried to provide a solid component which includes the sulfur dioxide-absorbing component, prior to contacting the gas with the sulfur dioxide-absorbing material. In this embodiment, it has been found that the gas must be conditioned to a relative humidity of between about 5 and 95%. Additionally, the temperature of the hot flue gas must be conditioned to between about 120° and 40° C. Preferably, the relative humidity of the humidified gas is brought to between about 20% and 80% and its temperature to between about 60° and 100° C. More preferably, the relative humidity of the humidified gas is brought to between about 30% and 70% and its temperature is reduced to between about 65° and 85° C. It will be appreciated that the most convenient means of achieving a humidification of a gas, and temperature reduction of gas, will be through the utilization of water, for example, mixed with the gas in a humidifier, prior to contacting the gas with the solid component. However, other methods of conditioning could be employed as exemplified by cooling of the flue gas or by steam injection into the flue gas.

Another step in the dry injection process involves contacting the humidified gas with the dried or partially dried solid component to form a gas/solid suspension, for a period of time sufficient to allow some absorption of gaseous sulfur dioxide by the solid component. and separating the solid component from the gas in the form of spent solids. This step can be achieved by the previously mentioned contactors and/or separators including bagfilter, electrostatic precipitators (ESP), and cyclones.

More particular aspects of the present invention relate to the use of high calcium fly ashes alone as essentially the sole source of calcium alkali and calcium-reactive silica or alumina. In these particular embodiments, calcium alkali and calcium-reactive silica or alumina are introduced into the slurry in a form consisting essentially of a high calcium fly ash. It has been discovered by the present inventors that when a fly ash having a sufficiently high calcium level is slurried at elevated temperatures, for example, temperatures between about 50° and 150° C., for from 0.5 to 24 hours, a highly reactive sulfur dioxide adsorbing component is formed or "activated" without the need to add additional lime or other calcium alkali source to the slurry.

In that low sulfur coal contains high calcium fly ash, this aspect of the present invention provides a useful alternative for these plants which utilize low sulfur coal. In such instances, it will be possible, for example, to get the advantages of flu gas desulfurization of the present invention without purchase of additional lime or other calcium alkali source, thus representing an important cost reduction where high calcium fly ash is available. The use of high calcium fly ash alone thus constitutes an improvement of existing processes for flue gas defulfurization by injection of lime and fly ash mixtures. It is submitted that embodiments employing high calcium fly ash alone will be most useful in the context of flue gas humidification, solids injection into the duct, and bag filter for solids collection. Moreover, the use of high calcium fly ash is amenable to embodiments employing the recycle of reacted solids.

As used herein, the phrase "high calcium fly ash" refers generally to fly ashes which have a calcium content, in the form of $CaO$ or $Ca(OH)_2$, of at least about 15% (wt %), with those fly ashes having a calcium content of greater than about 20% being more preferred. The most preferred sly ashes for use in accordance herewith are those having a calcium content of at least about 30%.

Where high calcium fly ashes are employed as essentially the sole calcium alkali and calcium-reactive silica or alumina source, it is generally desirable to slurry the fly ash at a temperature of between about 50° and 200° C. for a period of time of between about 0.1 and about 24 hours. However, temperatures ranging from about 70° to about 150° C. for between about 0.5 and about 24 hours are even more preferred, with the most preferred conditions being about 90° to about 150° C. for between about 0.2 and 6 hours. Of course, slurrying temperatures above 150° C. may be employed if desired. However, temperatures above about 200° C. are to be avoided in that the reactivity of the sulfur dioxide absorbing component formed at such temperatures is reduced dramatically.

It will generally be desirable to include in the slurry an amount of high calcium fly ash such that between about 1 and about 4 moles of calcium is introduced for every mole of sulfur to be removed from the gas. Even more preferably, the slurry will include an amount of high calcium fly ash such that between about 2 and about 3 moles of calcium are introduced for every mole of sulfur to be removed from the gas.

As with the more general embodiments of the present invention, the sulfur absorbing capability of high calcium fly ash slurries are improved by the addition of NaOH to the slurries. In particular, the addition of NaOH to provide a final NaOH concentration of between about 0.02 and about 0.5 M is recommended, with about 0.05 to about 0.25 M being preferred.

When high calcium fly ash slurries are used in connection with the desulfurization of humidified gas, it is generally desirable to humidify the gas to a relative humidity of between about 20 and 80% and a temperature of between about 100° and about 30° C., with temperatures of between about 60° and 90° C. being more preferable.

The present invention is also directed to an apparatus for reducing the level of sulfur in a sulfurcontaining gas which apparatus includes a means for slurrying an aqueous suspension, which suspension includes a sulfur dioxide-absorbing component, the slurry means further including a means for elevating the temperature of the suspension to above ambient; a means for admixing the gas with the aqueous suspension to provide a gas/liquid suspension; a means for drying the gas/liquid suspension to provide a gas/solid suspension; a means for separating the gas/solid suspension to provide a gaseous component and a solid component; and means for venting the treated gas; wherein the temperature elevating means is positioned in a manner to elevate the temperature of the suspension prior to admixture of the suspension with the gas by the admixing means.

As noted, slurry tanks in accordance with the present apparatus should also include a means for heating the slurry in a manner to conform with the processes of the present invention. For example, heating means in the form of an electrical heating element, steam driven heat exchanger, an aqueous preheating step or a steam injector are believed to work well in this regard. However, any method of heating the slurry to the desired temperatures for the desired time periods will suffice in the practice of the present invention.

In one embodiment, the admixing means comprises a rotary atomizer for atomization of the slurry into the gas. While a rotary atomizer is a preferred means for admixing the gas, other means may also be employed including, but not limited to, a fluid atomizer.

In the present apparatus, drying may be achieved in either one or two steps. In an apparatus adapted for practicing this two-step drying process, a drying function in the form of a spray dryer is provided in a housing which houses the rotary atomizer. In such housing, generally an almost total drying of the gas/liquid suspension is achieved. The dried gas/solid suspension is carried in a stream to a second absorption stage, which includes, for example, a pulse-jet baghouse for further reaction between the sulfur dioxide absorbing component and the sulfur-containing gas, to further achieve drying of the gas/solid suspension, and to separate died spent solids, containing sulfur-absorbed solids, from the gas. In a one-step drying procedure, a bagfilter alone will generally prove satisfactory.

However, in certain embodiments, for example, retrofit application to existing embodiments, an electrostatic precipitator or cyclone may be employed in place of a bagfilter.

Lastly, the apparatus includes a means for venting the treated gas into the atmosphere, for example a venting stack.

The present invention is also directed to an apparatus which is particularly suited to the dry injection of solids to humidified gas. In this apparatus, a drying means is provided to dry the slurry after it has been heated in accordance with the present invention, but prior to admixture of the slurry with the gas. In this embodiment, the drying means can be employed in the form of a fluidized bed, flash dryer, spray dryer, or other such means known in the art. The drying means may also employ a dewatering device, for example a vacuum device, before the primary drying means.

The dry injection apparatus will further include a means for humidifying the gas and means for admixing the humidified gas with the solid component to provide a gas solid suspension. The humidifying means will typically be in the form of a humidifying chamber wherein, for example, an atomizer is employed to atomize water into the gas and thereby achieve both humidification and reduction in the temperature of the hot flue gas. The admixing means will generally be in the form of a dry sorbent injector system as is commonly known in the art. The separating means (for example, a baghouse or electrostatic precipitator) can be employed as in the general embodiment.

DETAILED DESCRIPTION OF THE INVENTION

The CaO—SiO—Al$_2$O$_3$—H$_2$O Sulfur Absorption System

Figure 3A:
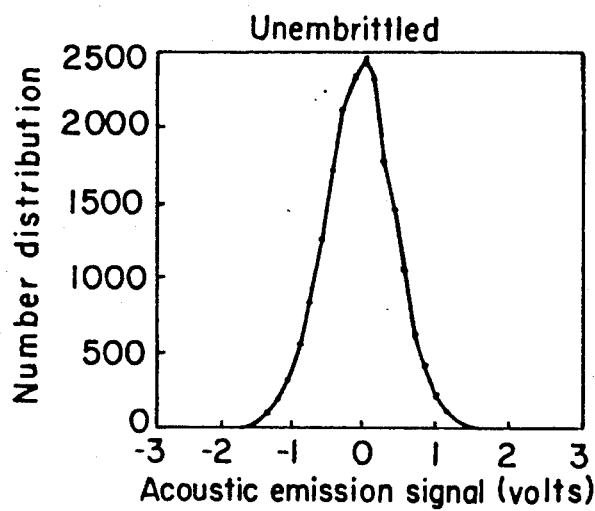
FIG. 3. The effect of fly ash I, II, III, and IV and relative humidity on $Ca(OH)_2$ utilization. 0.4 g of $Ca(OH)_2$ slurried with 1.6 g of fly ash I for 4 hours at 65° C. Atmospheric drying used for the preparation of samples. L = $Ca(OH)_2$ alone.
Figure 3B:
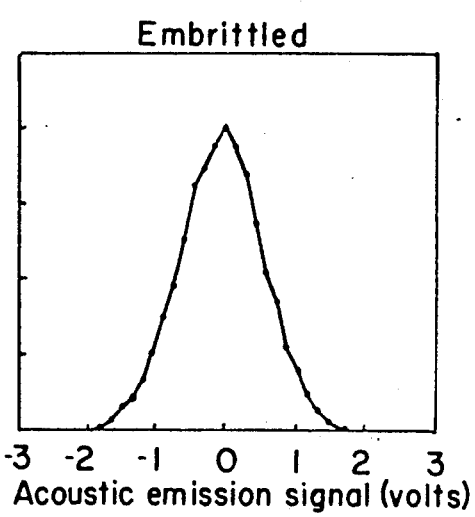
Figure 5A:
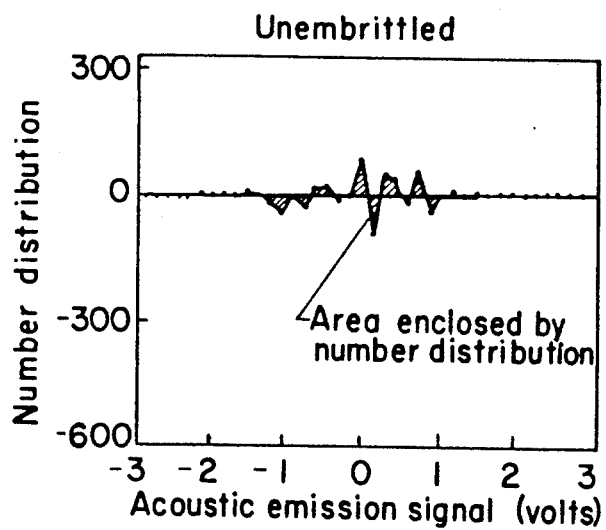
FIG. 5. A fly ash simulation experiment carried out at 54% RH. Samples of simulated fly ash (Av.Fa), $H_2SiO_3$, $Al_2O_3$, and $Fe_2O_3$ slurred with $Ca(OH)_2$ for 4 hours at 65° C. Atmospheric drying.
Figure 5B:
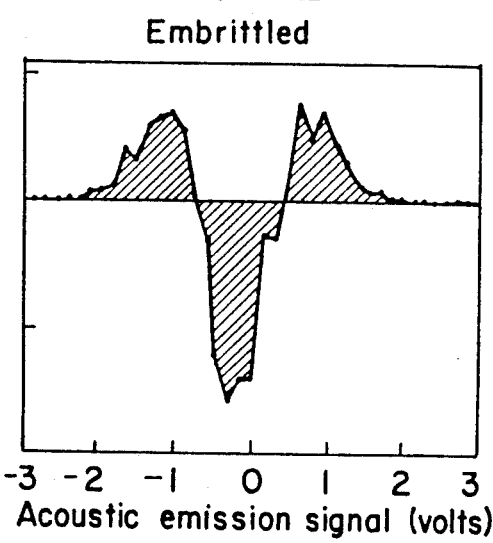

The nature of calcium silicate hydrate and calcium aluminate hydrate as well as calcium aluminate silicate hydrate formation in CaO—SiO—Al$_2$O$_3$—H$_2$O systems is very complicated. It is usually impossible to assign a simple chemical formula to it, especially at ordinary temperatures of interest in flue gas desulfurization. At temperatures from 20° C. to about 100° C., two main calcium silicate hydrates are formed, mono- and dicalcium silicate hydrates. Their ratio appears to depend on the initial ratio of calcium to silica in the slurry. Both monocalcium silicate hydrate—CaOxSiO$_2$xH$_2$O—and dicalcium silicate hydrate—(CaO)$_2$xSiO$_2$xH$_2$O—are fibrous gels of specific surface areas in the range of 100–300 m$^2$/g. At 20–100° C. after 8 hours of hydration, tobermorites (calcium silicate hydrates) may crystallize, also of high surface area.

The reaction of fly ash and Ca(OH)$_2$ in the presence of water is called a pozzolanic reaction. A pozzolan is a siliceous or siliceous and aluminous material which in itself possesses little or no cementitous value but will, in finely divided form and in the presence of moisture, chemically react with calcium hydroxide at ordinary temperatures to form compounds possessing cementitous properties. Due to small particle size and generally noncrystalline character, fly ash usually shows pozzolanic properties, or pozzolanic and cementitous properties in case of high-calcium ashes. High-calcium fly ash contains tricalcium aluminate hydrate, which is the most reactive mineral present within portland cement. Pozzolanic reactions give products with cementitous properties and with high surface area that can enhance SO$_2$ removal.

Pozzolan originated as a mortar of lime and ash (from Pozzouli, Italy) which the Romans used for stone constructions. The definition of pozzolanic reaction implies that spray dryer off-products, fly ashes, clays, and sands should be able to provide components to form calcium silicate hydrates, calcium aluminate hydrates, calcium alumino-ferrite hydrates, calcium sulfo-aluminate hydrates (ettringites), and calcium sulfo-aluminate-ferrite hydrates. However, not all siliceous and aluminous minerals are pozzolans (Chatterji et al., 1983). Crystalline minerals (mullite, silica as quartz) do not react with lime, especially at ordinary temperatures. Siliceous and/or aluminous materials must be non-crystalline and in small particles, in order to provide silica and alumina, after hydration in alkaline solutions, to form cementitous products. These reactions are the ones which constituents of portland cement undergo in the presence of water. The hydration reaction of aluminates in the presence of gypsum and lime and reaction of calcium silicates are as follows:

3CaOAl$_2$O$_3$ + 3CaSO$_4$2H$_2$O + aq→

6CaOAl$_2$O$_3$3SO$_3$32H$_2$O and 6CaOAl$_2$O$_3$Fe$_2$O$_3$3SO$_3$32H$_2$C

+ CaSO$_4$ + aq→4CaOAl$_2$O$_3$SO$_3$18H$_2$O and 4CaOAl$_2$O$_3$Fe$_2$O$_3$SO$_3$18H$_2$O + Ca(OH)$_2$ + aq→4CaOAl$_2$O$_3$19H$_2$O and 4CaOAl$_2$O$_3$Fe$_2$O$_3$19H$_2$O 3CaOSiO$_2$ and 2CaOSiO$_2$ + aq→CaOSiO$_2$H$_2$O + Ca(OH)$_2$ Typical portland cement consists of 50% tricalcium silicate, 25% dicalcium silicate, 10% tricalcium aluminate, 9% calcium alumino-ferrite, and 6% calcium sulfate. Tricalcium silicate appears to be the most reactive mineral present within the portland cement. The main product of hydration of portland cement's silicate materials is calcium silicate hydrate of colloidal dimensions. All calcium silicate hydrates are fibrous gels in early stage of formation and their surface area is in the range of 100–300 m$^2$/g. Moreover, Tobermorite gel plays a vital role in establishing the strength of concrete.

When considering the spray dryer/bag filter system, typically one is dealing with fly ash as a source of silica instead of amorphous silica. The solubility of quartz particles of 3–15 um diameter in water is 11 ppm at 25° C. and 60 ppm at 100° C. The corresponding values for amorphous silica are 130 ppm and 420 ppm, respectively Temperature and pH have strong effects on the solubility of amorphous silica. When pH was adjusted with NaOH up to 10.5 from 7 at 25° C., solubility was found to increase to 1000 ppm. Above a pH of 10.7, all the solid phase of amorphous silica dissolves to form soluble silicate. Therefore it would be reasonable to expect the dissolution of fly ash to be the limiting step in the formation of calcium silicate hydrates. Because of the lower solubility of fly ash, the specific surface area of the Ca(OH)$_2$/silica reaction product is smaller than values reported for laboratory studies with amorphous silica. Also, it is not clear whether the development of the specific surface area of the product of hydration (for a given ratio of Ca(OH)$_2$/fly ash) increases proportionally to the amount of conditioned lime.

Because of low fly ash reactivity it is often desirable to know the exact characteristics of fly ash to be used. Usually fly ashes are divided into two categories: low-calcium (containing less than 5% of analytical CaO) from burning bituminous or anthracite coals and high-calcium (up to 35% Ca) from burning lignite or subbituminous coals. However, from the point of perspective reactivity and formation of calcium silicate hydrates, it is generally more important how much more amorphous material there is within the fly ash as compared with crystalline substances. Higher contents of crystalline phases (alpha-quartz, mullite, sillimanite, hematite, magnetite) lowers the reactivity of fly ash. Low-calcium fly ashes consist mainly of aluminosilicate glass due to the high proportions of silica and alumina. However, some crystallization takes place in the boiler when fly ash is cooling and, as a result, crystalline phases are detected under glass.

For high-calcium fly ash it appears that the glass structure is different. It has been postulated that it is composed of significant amounts of CaO & Al$_2$O$_3$, which is known to be highly reactive. Since the noncrystalline component comprises sometimes as much as 80% of highcalcium fly ash it seems that the reason for high reactivity of high-calcium fly ash may be in the composition of glass. On the other hand, higher contents of unburnt carbon in the low-calcium fly ash may add to its reactivity. These carbon particles are usually of high internal surface area and may bind water and admixtures when the fly ash is slurried.

In a study of surface area and porosity of fractionated fly ash from burning low-sulfur, high-ash coal, the largest fraction (>125um) had a surface area of 9.44m$^2$/g whereas the finest fraction (>7um) had a surface area of 1.27$^2$/g. Since large particles constitute a small fraction of fly ash only, the above effect is relatively insignificant. Industrial experiments should our perform laboratory tests, since it has been found that high-calcium fly ash passed the lime pozzolanic activity test when commercial source of lime was used, but failed to do so in the presence of a reagent grade $Ca(OH)_2$. This effect is possibly the result of impurities in lime which have formed poorly-crystallized hydrates.

The prospect of having calcium silicate hydrates in the spray dryer/bag filter therefore appears to be very attractive since they have high surface area and are highly hydrated and therefore should offer high $SO_2$ removal potential The formation would take place in the recycle system, specifically in the reactant tank. During fly ash recycle in dry flue gas desulfurization systems, reaction of fly ash with makeup $Ca(OH)_2$ probably takes place in several steps. First lime would be dissolved, then silica and alumina—originally contained within the fly ash—would be digested and, by the means of providing favorable slurrying conditions, calcium silicate/aluminate hydrates would be formed.

System Overview

Figure 1:
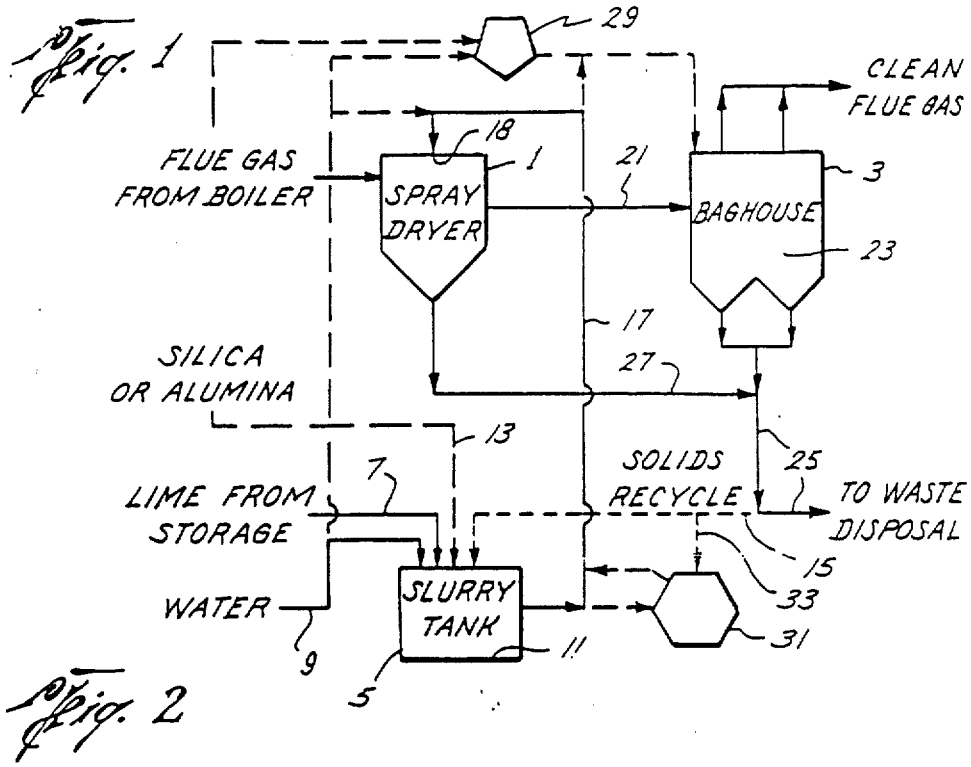
FIG. 1. Schematic Diagram of a Spray Dryer System.

Referring to FIG. 1 is seen a diagram of a typical spray dryer system which is particularly well suited to the practice of the processes of the present invention. Depicted therein is a spray dryer 1, a baghouse 3, and a slurry tank 5. The slurry tank 5 is adapted to receive calcium alkali, in the form of, for example, lime from storage by means of conduit 7, and water by means of conduit 9. The slurry tank further includes a heating element 11 adapted to heat the slurry for times and to temperatures in accordance with processes of the present invention. The system may be adapted to provide calcium reactive alumina or silica directly to the slurry from storage by means of conduit 13 or, alternatively, calcium reactive silica or alumina is supplied to the slurry tank 5 by means of a recycle conduit 15 containing a sulfurabsorbed solids recycle, which includes, for example, fly ash from the boiler.

To obtain best results, the slurry tank 5 is designed to mix a mass ratio of water to solids ranging from 1:1 to 20:1. Moreover, the slurry tank 5 and heating element 11, are adapted so as to enable a heating of the slurry to a temperature ranging from about 40° C. to about 140° C. for between about 0.5 to about 48 hours.

The heat-treated slurry is conveyed to the spray dryer 1 by means of conduit 17. In the spray dryer 1, the slurry is admixed with flue gas from the boiler by means of a rotary atomizer 19. The gas/slurry mixture is partially dried in the spray dryer 1 which is typically designed to achieve a gas/slurry contact time of between about 2 and about 10 seconds. In addition, a partial absorption of sulfur by the slurry is achieved in the spray dryer 1.

From the spray dryer 1, the partially dried particles sulfur-absorbed gas/slurry admixture is conveyed to the baghouse 3 by means of conduit 21, wherein further drying and further absorption of sulfur by the sulfur-adsorbing component of the slurry takes place. Within the baghouse 3, the gas/slurry mixture is directed onto a bagfilter 23 wherein sulfur-absorbed solids are deposited and further absorption and drying takes place. The bagfilter 23 thus serves a dual purpose of separating gas from dried solids and collecting the solids for disposal by means of conduits 25, or recycle of solids by means of conduit 15. Separated gases are vented by means of conduit 29. Solids collected in the spray dryer are mixed with baghouse solids by means of conduit 27. Typically, the baghouse 3 and bagfilter 23 are designed to achieve a residence time of between about 5 and 300 minutes.

In system embodiments for use in conjunction with dry injection of solids, the system will typically include a humidifier 29 in place of the spray dryer 1, wherein hot flue gas is admixed with water to provide humidified, cooled gas. Moreover, the system would also further include a drying tank 31 wherein the slurry is dried prior to admixture of the dried slurry with the humidified gas. Additionally, the dry injection system may include a recycle conduit 33 for admixture of recycled solids with the slurry mixture in the drying tank 31, to further assist in drying the slurry mixture. Alternatively, the spray dryer 1 itself can serve as a combination humidifier and injector wherein the dried slurry is injected into the spray dryer 1 along with water to provide admixture of the dried slurry together with the water and the gas.

EXAMPLE I:

LAB SCALE EXPERIMENTS

Apparatus

Figure 2:
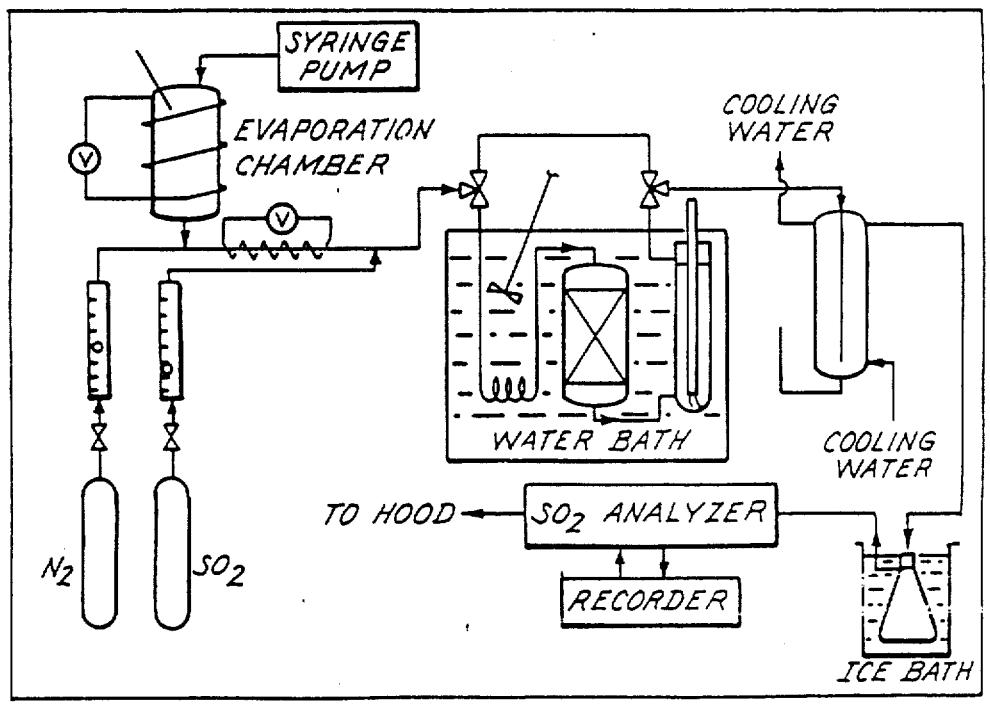
FIG. 2. Experimental apparatus.

Experiments were conducted in the apparatus shown in FIG. 2. The glass reactor (40mm in diameter, 120mm in height) was packed with a powdered reagent mixed with 40 g of 100 mesh silica sand to prevent channelling of $Ca(OH)_2$. The reactor was immersed in a water bath thermostated to within approximately 0.1° C. Simulated flue gas was obtained by mixing nitrogen and sulfur dioxide from gas cylinders. The flow of gas was monitored using rotameters. Water was metered by a syringe pump, evaporated, and injected into dry gas. Reactor upstream tubing was heated to prevent the condensation of the moisture.

Before entering the analyzer, the gas was cooled and water condensed in an ice bath. The $SO_2$ concentration was measured with a pulsed fluorescent $SO_2$ analyzer (ThermoElectron Model 40). A bypass of the reactor was provided to allow preconditioning of the bed and stabilization of gas flow at the desired $SO_2$ concentration Prior to each run the bed was humidified by passing pure nitrogen at a relative humidity of about 98% for 6 minutes and then pure nitrogen at a relative humidity at which the experiment was to be performed for 10 minutes Most of the experiments were performed at a relative humidity of 54% with some experiments at 17% and 74%. At typical flue gas conditions, 17, 54, and 74% relative humidity corresponds to 38, 9.5, and 4.7 C approach to saturation, respectively. Reactor temperature was 95, 66, and 64.4° C. for 17, 54, 74% relative humidity, respectively. Common purity (99.5%) nitrogen at 4.6 l/min (0° C., 1 atm) was used as a carrier gas. The nominal concentration of $SO_2$ was 500 ppm and exposure time of the sample to the sulfurized gas was 1 hour.

Preparation of the Samples

The sample preparation consisted of two essential steps: stirring and drying. In every experiment 0.4 of reagent grade $Ca(OH)_2$ was used. This amount of lime was slurried with fly ash or other additive at the desired weight ratio. The water to solids ratio was between 10:1 and 20:1—most often 15:1. A propeller stirrer at 350 rpm was used to agitate the slurry. Slurrying time varied from 2 to 24 hours and the temperature of the slurry was set at 25 to 92° C.

Two different methods of sample preparation was used during this study. In atmospheric drying, samples were not filtered after slurrying and were dried overnight in an atmospheric over at 85–90° C. It took several hours to evaporate the water. The new drying procedure—vacuum drying—was introduced to minimize the additional reaction time of a wet sample in high oven temperature (85–90° C.). In this method the samples were vacuum filtered (about 5 min) and subsequently vacuum dried (about 10 min) at 95° C. The time of vacuum filtering and drying depended on the fineness of the sample and was monitored by the thermocouple placed in the dried sample and connected to the temperature recorder. In this way the moment when all the free moisture was evaporated could be easily seen and vacuum drying stopped, therefore minimizing the residence time of the sample in the oven.

Characterization of the Samples

Figure 3:
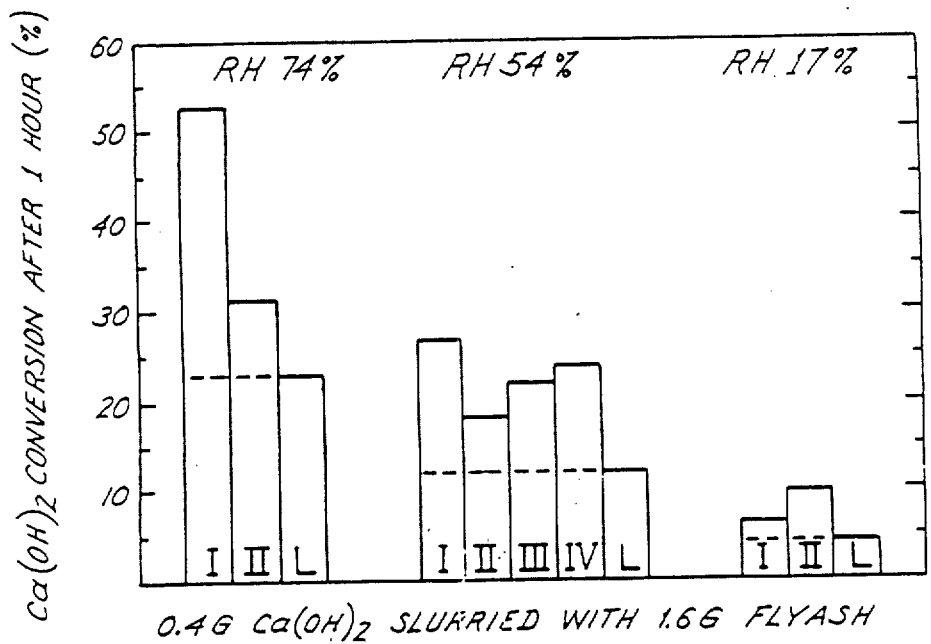
Figure 4:
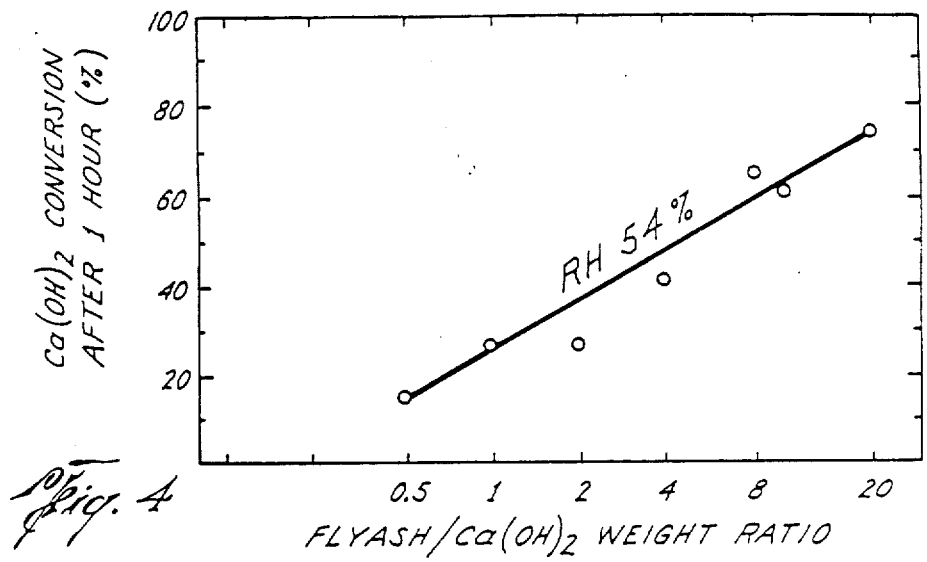

Four different fly ashes were slurried with $Ca(OH)_2$. The characterization of fly ashes is given in Table I. During the experiments on slurrying conditions, a new batch of fly ash IV was used. It was obtained from the same vendor and was produced by burning coal from, reportedly, the same source. These samples were characterized by scanning electron microscopy (SEM). The composition of the particles has been found using Kevex Micro-X 7000 X-ray Energy Spectrometer (XES). Mean particle size was determined using the Hiac-Royco particle counter.

in FIG. 3 are the conversions when lime only was exposed to the sulfurized gas. As can be seen, all fly ashes improved the utilization at every RH investigated. Samples with fly ash loading of 16 (slurried at the same conditions as above) enhanced utilization of RH 54% to a greater extent than was the case for fly ash loading of 4. The utilization of lime was 67, 79, 65, 71% when fly ash I, II, III, IV was used, respectively. These values were much higher than the ones presented in FIG. 3. Based on these two series of experiments no correlation was found between $SO_2$ removed and calcium content of fly ash sample. SEM photographs of the mixtures of $Ca(OH)_2$ with fly ash II, III, and IV at fly ash loading of 4 demonstrated a highly irregular deposit covering the spherules of fly ash in every picture.

Fly ash I was selected to test the effect of fly ash loading on the utilization of lime. The results of experiments at RH 54% are presented in FIG. 4. The conversion of $Ca(OH)_2$ increased with increasing loading of fly ash. The increase of fly ash loading from 0.5 to 20 increased the $Ca(OH)_2$ utilization from 17 to 78%. An SEM photograph of fly ash I slurried with $Ca(OH)_2$ at the low loading of 0.5 demonstrated that the deposit is very slight and unreacted chunks of $Ca(OH)_2$ were seen next to fly ash particles.

The Effect of Reagent Grade Additives

Figure 5:
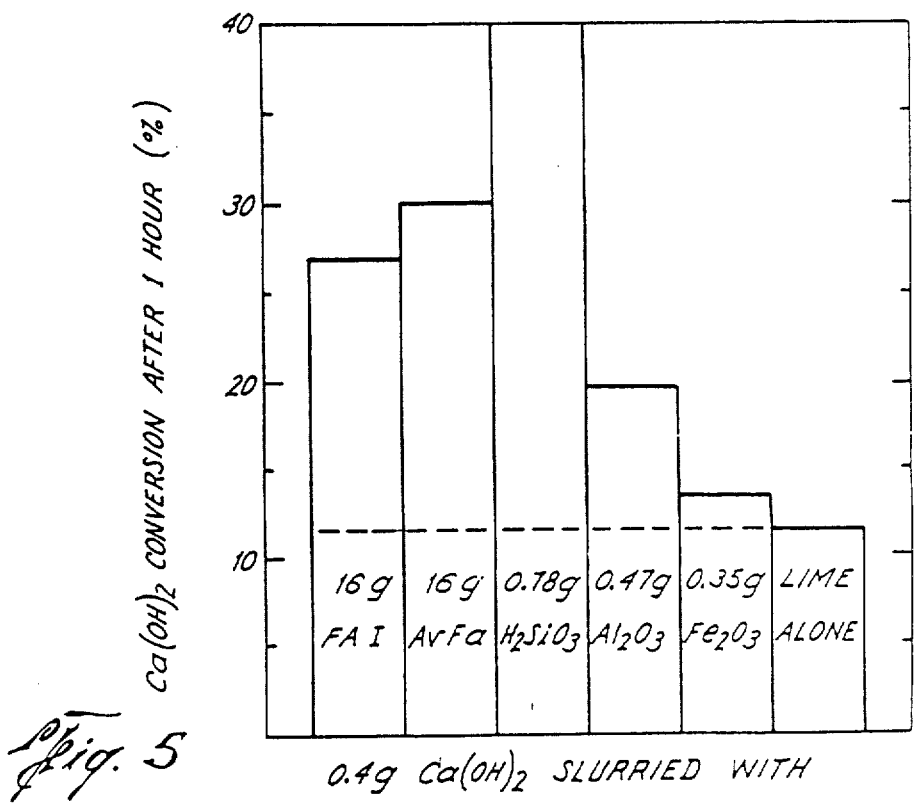
Figure 6:
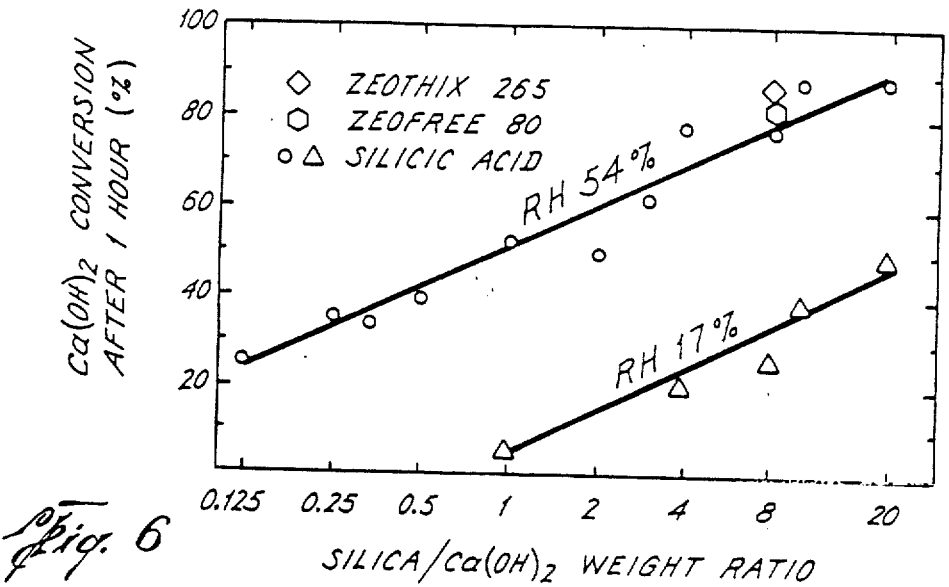
Figure 7:
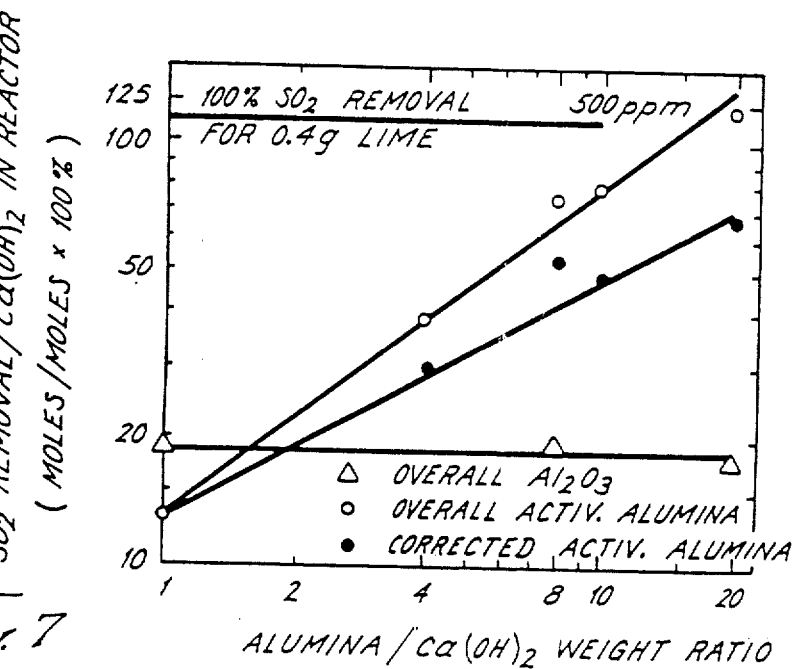
Figure 8:
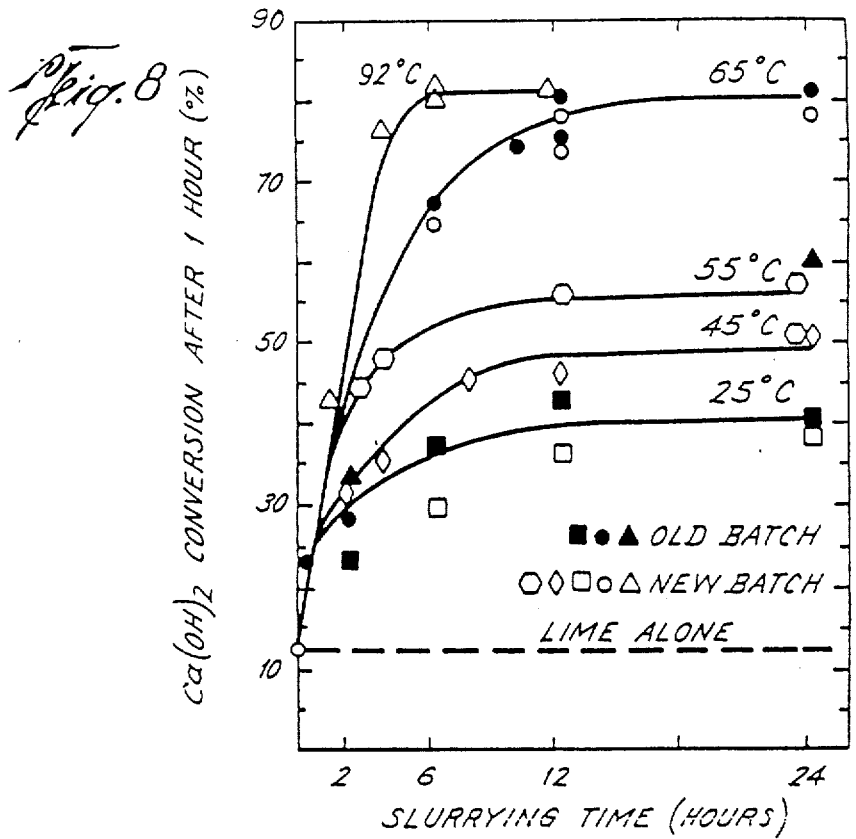
Figure 9:
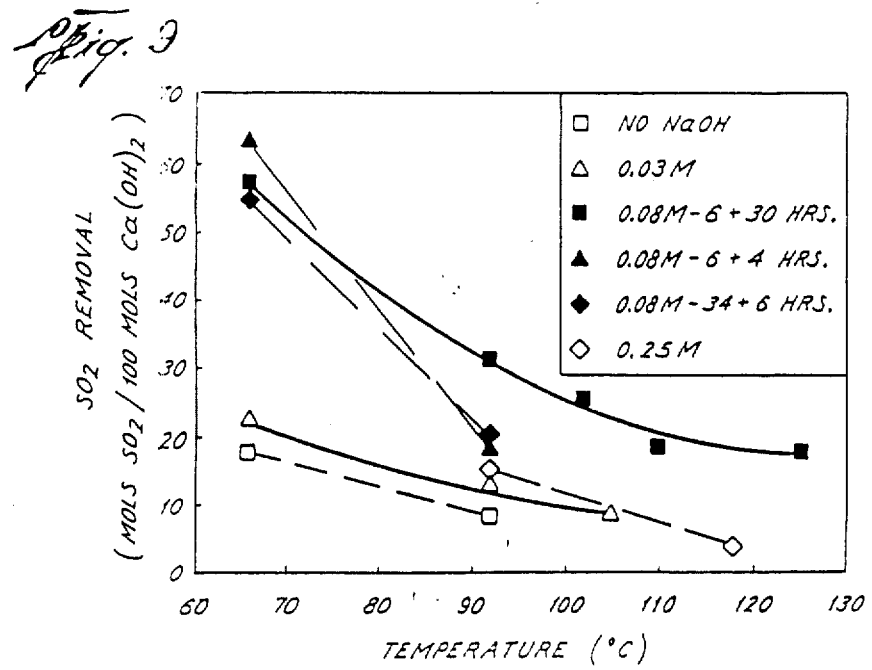
Figure 10:
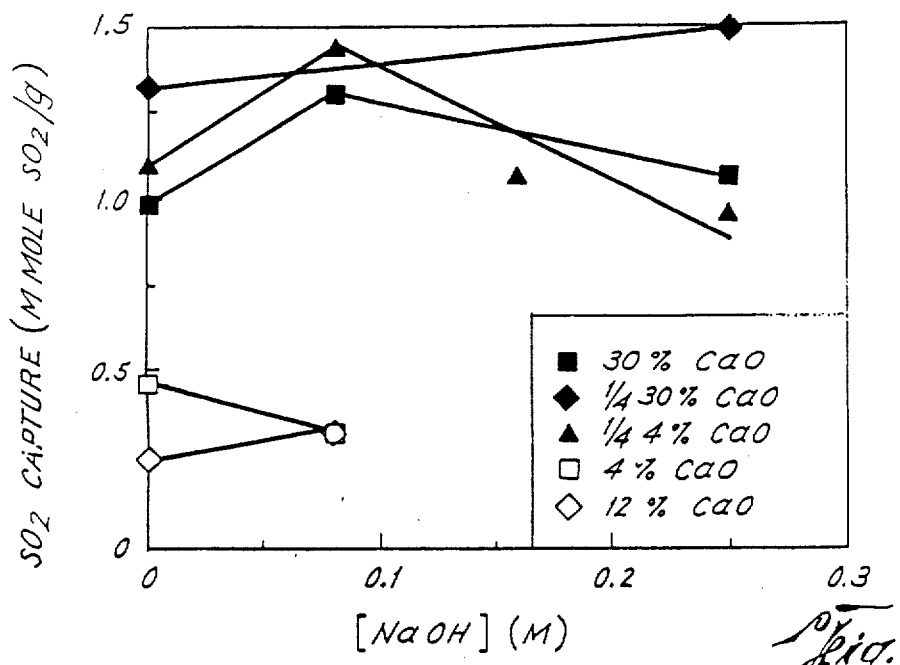
Figure 11:
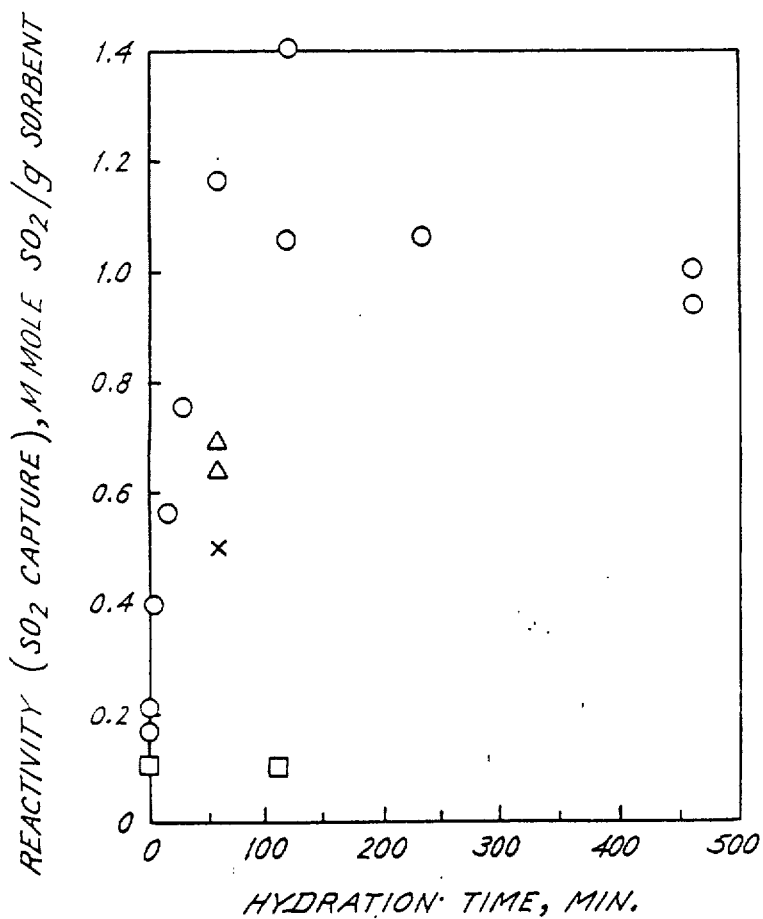

The other main components of fly ash were also investigated. Reagent grade $Al_2O_3$, $Fe_2O_3$, and $H_2SiO_3$ (silicic acid) were used as a source of alumina, iron, and silica, respectively. Fly ash was simulated as a mixture of three substances: 49% $H_2SiO_3$, 29% $Al_2O_3$, and 22% $Fe_2O_3$ (weight %). Atmospheric drying was used for the preparation of samples. The results are presented in FIG. 5, giving the conversion of $Ca(OH)_2$ at RH 54%. During these experiments $Ca(OH)_2$ was slurried with additives for 4 hours at 65° C. As can be seen from FIG. 5, 1.6 g of mixture slurried with 0.4 g of $Ca(OH)_2$ modelled closely the utilization when fly ash I was used (30 and 27%, respectively). This again implies that calcium content of fly ash is not of primary importance, since the utilization of added $Ca(OH)_2$ was even higher when no fly ashbound calcium was present. Next 0.4 g of

TABLE I

| Fly Ash | Fly Ash Characterization | | | | |
|---|---|---|---|---|---|
| | I | II | III | IV | |
| Power Plant | Bull Run Plant TVA | Gibson Plant Public Service of Indiana | Seminole Electric Coop. Palatka, Fl | San Miguel Electric Coop. San Miguel, TX | |
| Coal Type | bituminous | bituminous | bituminous | lignite | |
| XES Analysis [weight %] | | | | | |
| CA | 34 | 5 | 4 | 11[1] | 15[2] |
| Si | 42 | 41 | 59 | 66 | 68 |
| Fe | 6 | 31 | 15 | 4 | 2 |
| Al | 16 | 20 | 20 | 18 | 14 |
| Mass Median Particle Size [um] | 19 | 9 | 14 | 10 | 10 |

[1]Old Batch
[2]New Batch

The Effect of Fly Ash Type an Ratio

Four samples of fly ash were slurried with 0.4 g of lime at a fly ash loading of 4 (4 g fly ash/g $Ca(OH)_2$) for 4 hours at 65° C. and reacted at a relative humidity of 54% (RH 54%). Atmospheric drying was used for the preparation of samples. The samples having the best and the worst performance at RH 54% were also tested at the extreme humidities of 17% and 74%. The results of these experiments are presented in FIG. 3. Also shown $Ca(OH)_2$ was slurried separately with each component used to simulate the fly ash. Component loading was kept the same as it was when 1.6 g of mixture was used (i.e., 0.78 g, 0.47 g, and 0.35 g of $H_2SiO_3$, $Al_2O_3$, $Fe_2O_3$ were used, respectively).

Figure 4:
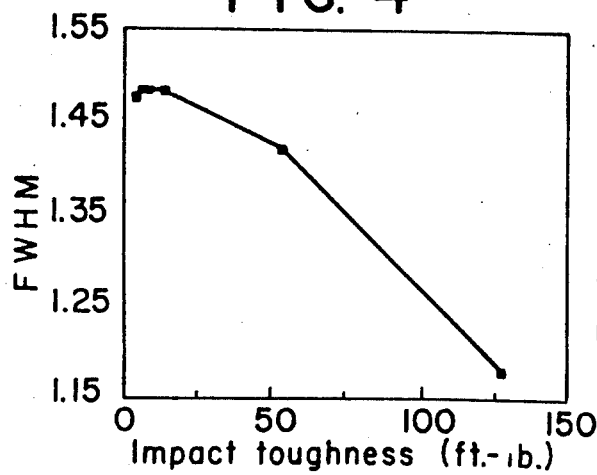
FIG. 4. The effect of fly ash I loading (g fly ash/g $Ca(OH)_2$) on lime utilization. Samples slurried for 4 hours at 65° C. Atmospheric drying.
Figure 6:
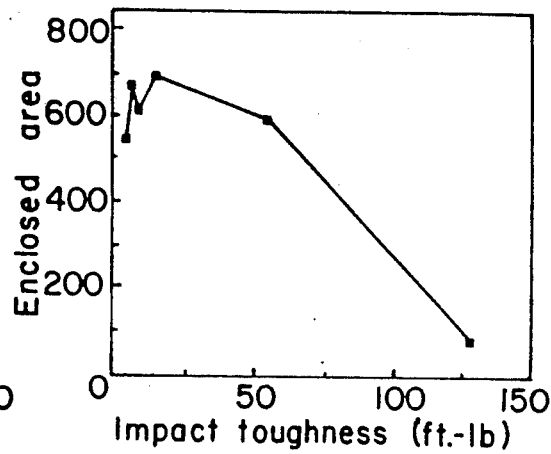
FIG. 6. The effect of silica ($H_2SiO_3$, Zeothix 265, or Zeofree 80) loading (g silica/g $Ca(OH)_2$) on time utilization. Atmospheric drying.

The addition of silicic acid had the most significant effect, increasing $Ca(OH)_2$ utilization from 12 to 40%. No $SO_2$ removal was observed when silicic acid alone was exposed to simulated flue gas. FIG. 6 gives the effect of silica loading on conversion at RH 17 and 54%. Silicic acid was used for most of these experiments. SEM photographs were taken of samples of silicic acid/Ca(OH)$_2$ slurried at 65° C. for 4 hours at silicic acid loading of 4 and 10, respectively. In both, highly developed surface of irregularly shaped particles were seen. Some experiments were performed with artificial precipitated silicas of extremely high surface areas. They were Zeothix 265 and Zeofree 80 of surface area 250 and 140 m$^2$/g, respectively (samples and surface area data obtained courtesy of Huber Corp.). However, these substances did not enhance Ca(OH)$_2$ utilization significantly better than silicic acid (FIG. 6). As can be seen from FIG. 6, both values of RH tested, Ca(OH)$_2$ utilization increased with the increasing loading of silicic acid. The comparison of the results presented in FIGS. 4 and 6 shows that silicic acid promotes Ca(OH)$_2$ utilization better than fly ash. For example, at RH 54% and fly ash loading of 8 (total fly ash) the conversion of Ca(OH)$_2$ was 78% when silicic acid was used and 61% when fly ash I was used.

Reactivities of fly ash and silicic acid should be compared on the basis of silica content. Assuming that fly ash I is 50% silica, a silicic acid loading of 8 should be compared to fly ash I loading of 16 (conversions of 78 and 68%). The difference between silicic acid and fly ash is more apparent at lower loadings. For silicic acid loading of 1, conversion was 53% and for the fly ash I loading of 2 it was 32%. This comparison shows that Ca(OH)$_2$ conversion depends on the reactivity of siliceous material used.

Experiments were performed at RH of 54% with precipitated calcium silicate XP-974 (also from Huber Corp., surface area of 215 m$^2$/g, average particle size 6.1 um). The sample was taken "as received" and was not slurried. As SEM photograph of this sample showed the particle of calcium silicate as having an irregular surface area similar to that produced when silicic acid and Ca(OH)$_2$ were slurried.

Figure 7:
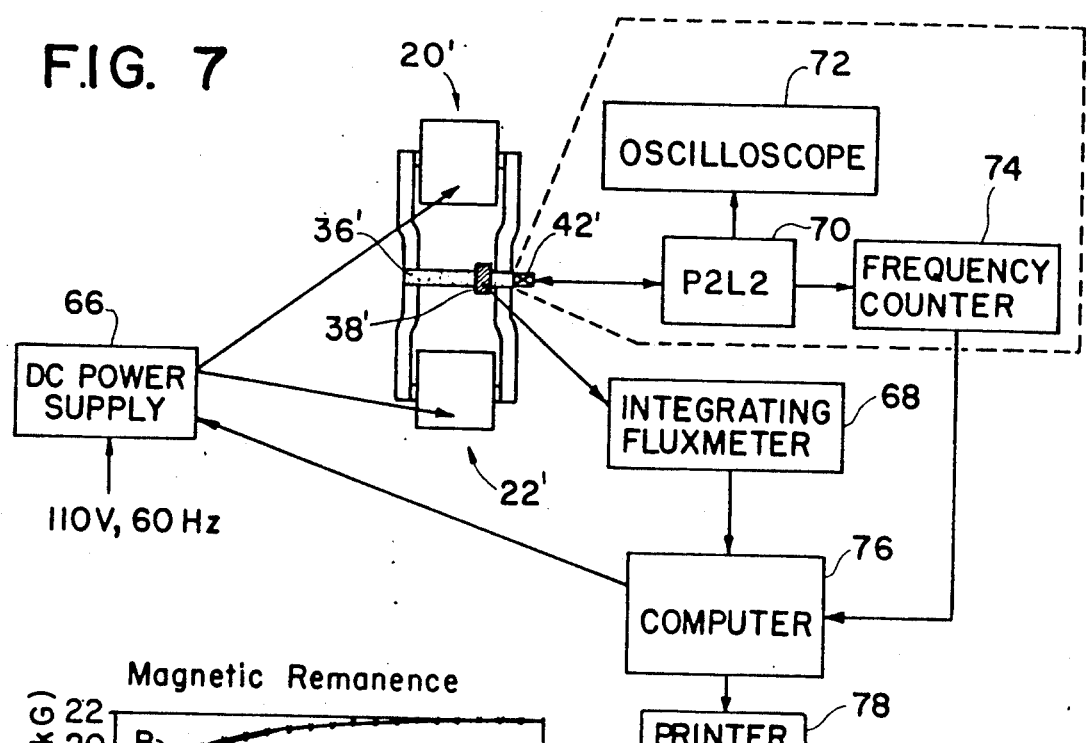
FIG. 7. The effect of alumina loading (g alumina/g $Ca(OH)_2$) on lime utilization. Atmospheric drying.

The effect of alumina loading was tested using two sources of alumina. The results of experiments at 54% RH are shown in FIG. 7. As can be seen, when reagent grade Al$_2$O$_3$ was used, increasing the loading did not change SO$_2$ removal. No SO$_2$ removal was observed for Al$_2$O$_3$ alone. The removal increased with increasing loading of alumina when activated alumina of chromatographic grade (80-200 mesh) was used. However, activated alumina alone removed SO$_2$. The adsorptive capacity of activated alumina was calculated as 0.023 g of SO$_2$ per gram. Based on this value, the corrected SO$_2$ removal has been determined due to the possible formation of calcium aluminates. The empty points in FIG. 7 (○) represent the overall removal of SO$_2$ while the filled points (●) show the corrected values. These corrected values are lower than the ones observed for the same loading when silicic acid was used instead of alumina. Therefore, the silica content of fly ash is mainly responsible for the enhancement of Ca(OH)$_2$ utilization.

The Effect of Slurrying Conditions

Figure 8:
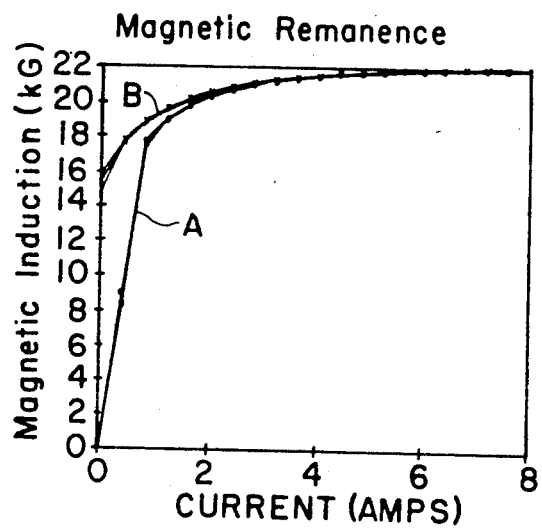
FIG. 8. The effect of fly ash IV on $Ca(OH)_2$ reactivity. Fly ash IV loading 16. Vacuum drying.

Slurrying tests were performed at 25, 45, 55, 64, and 92° C. and time was varied from 2 to 24 hours. The samples for these tests were prepared by vacuum filtration and vacuum drying. Both old and new batches of fly ash IV were used as a source of silica at 16 g fly ash/g Ca(OH)$_2$. Relative humidity during exposure was 54%. The results are presented in FIG. 8.

As can be seen, the temperature was the decisive parameter affecting the process. The results show that there is a critical slurrying time for every temperature tested after which Ca(OH)$_2$ conversion reaches a maximum value. Ca(OH)$_2$ conversion converged on 40% after 16 hours of slurrying at 25° C. and 80% after 5 hours at 92° C. It took 15 hours to converge on 80% conversion of Ca(OH)$_2$ when slurrying at 65° C. Compared with 12% utilization of Ca(OH)$_2$ alone at 54% RH, the 80% utilization of fly ash/Ca(OH)$_2$ slurried at 65° C. was dramatically improved.

Figure 9:
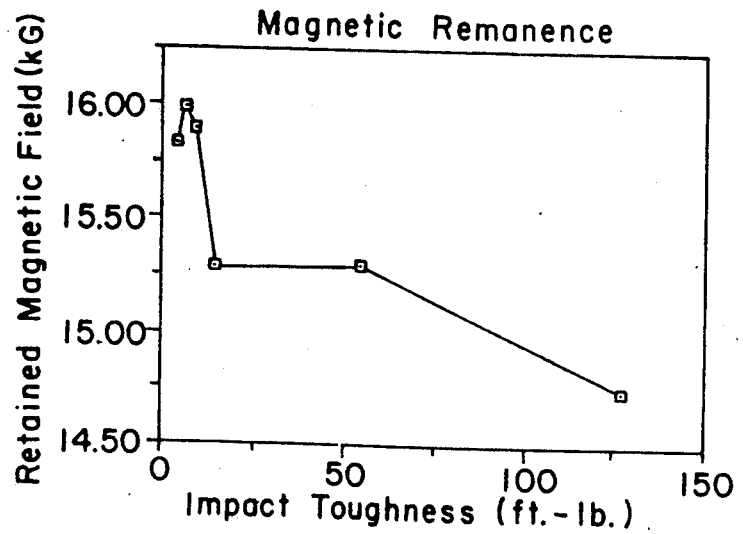
FIG. 9. Effect of NaOH concentration on $SO_2$ removal. 1 $Ca(OH)_2$:4 Fly Ash:4 $CaSO_3$—10 mol% NaOH; Removal after 1 hour; 500 ppm $SO_2$; 500 ppm $NO_x$; 14 mol% $H_2O$; gas flow: 4.6 1/min—7% $O_2$, 10% $CO_2$; 83% $N_2$.
Figure 10:
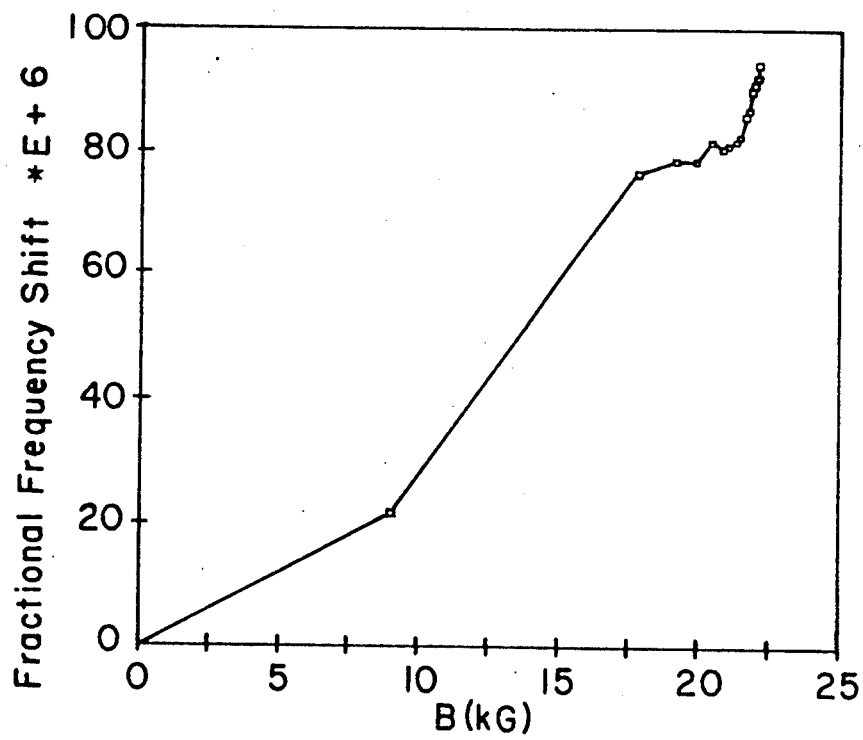
FIG. 10. The $SO_2$ capture ability of high calcium fly ash solids as a function of NaOH concentration. About 50 g solids/liter $H_2O$ were slurried at 85° C. and tested for $SO_2$ capture ability. Samples tested were as follows: (●) fly ash containing 30% CaO slurried without added $Ca(OH)_2$ (Laramie River); (◆) 4 parts fly ash containing 30% CaO slurried with 1 part $CA(OH)_2$; (▲) 4 parts fly ash containing 4% CaO (Clinch River) slurried with 1 part $Ca(OH)_2$; (□) fly ash containing 4% CaO slurried without added $Ca(OH)_2$; (◆) fly ash containing 12% CaO (Craig Station) slurried without added $Ca(OH)_2$. Slurry reactor conditions: 12 hours at 85° C.; gas/solid reactor conditions: 66° C.; 55% R.H.; 4.61 gas/min—7% $O_2$, 10% $CO_2$, 83% $N_2$; 450 ppm $SO_2$; 12 mole % $H_2O$; 1 hr reaction time.
Figure 11:
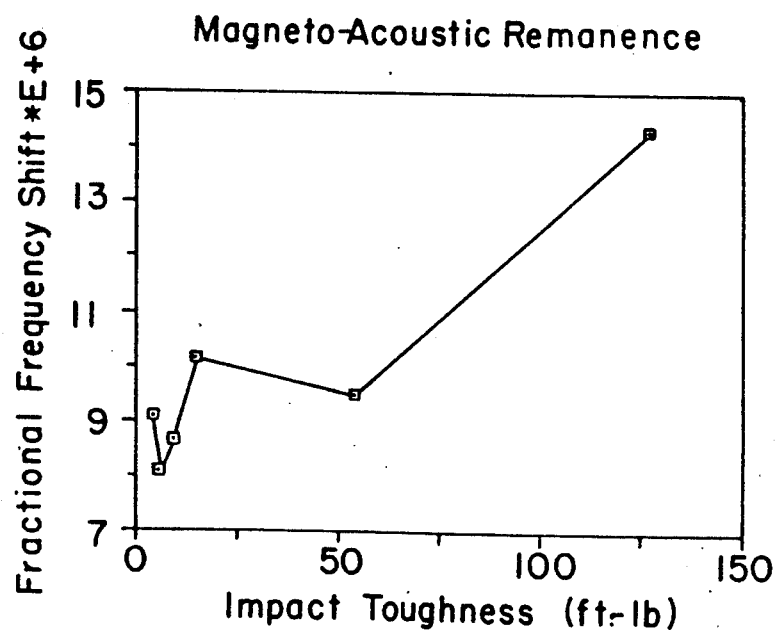
FIG. 11. Reactivity (SO$_2$ capture) of high calcium (Hoot Lake) and low calcium (Clinch River) fly ash versus hydration time. (●) high calcium fly ash, normal hydration at 90° C. and 33% solids; (Δ) high calcium fly ash, normal hydration at 50° C. and 33% solids; (X) high calcium fly ash, normal hydration at room temperature and 33% solids; (□) low calcium fly ash, normal hydration at 90° C. and 33% solids.

The maximum utilization of Ca(OH)$_2$ is not a uniform function of slurry temperature (40, 50, 55, 80, and 80%, for 25, 45, 55, 65, and 92° C., respectively). There appeared to be a discontinuity between 55 and 65° C. slurrying temperature that may indicate a change in the hydration state of the calcium aluminum silicate. The resulting solid had better reactivity for SO$_2$ removal than that formed below 65° C. When tested by Differential Scanning Calorimeter (DSC) the solids formed at 65° C. and 92° C. have an additional endothermic peak between 416 and 465 K. No peak was observed for samples slurried at 25, 45 and 55° C. The DSC scans of the samples of fly ash IV/Ca(OH)$_2$ (at the weight ratio of 16:1) slurried at 92, 65, and 55° C. are shown in FIGS. 9, 10 and 11, respectively. The effect of a step change in reactivity also took place when fly ash III was slurried with Ca(OH)$_2$ at the fly ash loading of 16:1 at 65 and 45° C. The conversion of Ca(OH)$_2$ was 63 and 43%, respectively.

SEM photographs were taken to document the development of the surface area of the samples. In samples slurried for "0" time, separate fly ash spheres with smooth surfaces (as in an unslurried fly ash) and irregular particles of lime were seen. After 24 hours of slurrying at 25C., the particles were covered with tiny deposits. The product on the surface of the fly ash became more densely precipitated after 24 hours of slurrying at 65° C. Increasing the temperature of slurrying to 92°C. resulted in a very well developed surface area of the deposit.

The Effect of Calcium Sulfite/Sulfate

Calcium sulfite or calcium sulfate were slurried with Ca(OH)$_2$ to simulate the recycle of spent lime. Laboratory produced calcium sulfite hemihydrate (90% CaSO$_3$12H$_2$O+10% CaSO$_4$) and reagent grade calcium sulfate dihydrate were used in these experiments. Vacuum drying was used for the preparation of the samples. Samples of fly ash IV/Ca(OH)$_2$/CaSO$_3$ at a weight ratio of 16:1:4 were slurried for 6 hours at 25, 45, and 65° C. The resulting conversions of Ca(OH)$_2$ were 41, 61, and 74%, respectively. Conversion of the fly ash/Ca(OH)$_2$/CaSO$_3$ sample at a weight ratio of 16:1:4 slurried for 6 hours at 65° C. was higher than conversion of the corresponding fly ash/Ca(OH)$_2$ sample at a weight ratio of 20:1, which was 70%. Samples at a weight ratio of 16:1:1 were slurried for 6 hours at 25 and 65° C. and yielded Ca(OH)$_2$ conversions of 21 and 61%, respectively. SEM photographs of the fly ash IV/Ca(OH)$_2$/CaSO$_3$ samples at weight ratios of 16:1:4 and 16:1:1 demonstrated long crystals that may be calcium aluminate sulfate hydrates (ettringite) of general formula 3CaO Al$_2$O$_3$3CaSO$_4$xH$_2$O (x is most often within the range 30-32). These long crystals were not formed when only calcium sulfite was slurried with Ca(OH)$_2$ for 6 hours at 65° C. and at the weight ratio of 4:1 (Ca(OH)$_2$ conversion was 16%). Separate clusters of calcium sulfite and Ca(OH)$_2$ were visible by SEM. It may be that the formation of ettringite provides additional potential for SO$_2$ removal.

Two ratios of fly ash/Ca(OH)$_2$/calcium sulfate were tried. At a ratio of 16:1:4, Ca(OH)$_2$ conversion was 60% for samples slurried for 6 hours at both 25 and 65° C. At a lower ratio of 16:1:1, the conversion was 51 and 31% for samples slurried for 6 hours at 65 and 25° C., respectively. SEM photographs of the sample at a weight ratio of 16:1:4 slurried for 6 hours at 65° C. revealed fly ash speres with the precipitate on the surface, as well as calcium sulfate and long crystals (ettringite).

Both calcium sulfite and calcium sulfate improved the utilization of Ca(OH)$_2$ after slurrying the samples for 6 hours at 25° C. and a weight ratio of 16:1:4. However, at a fly ash/Ca(OH)$_2$/CaSO$_3$ ratio of 16:1:1, the conversion for samples slurried for 6 hours at 25 and 65° C. was lower than when fly ash was slurried at the same conditions with Ca(OH)$_2$ alone (21, 61, and 67%, respectively).

The Effect of Fly Ash Particle Size

Fly ash IV was wet-sieved into five fractions which are characterized in Table II. The fractionated fly ash was slurried with 0.4 g of Ca(OH)$_2$ at a loading of 16 for 6 hours at 65° C. Vacuum drying was used for the preparation of samples. The results of these experiments are shown in Table II. Also shown in Table II is the base case conversion of Ca(OH)$_2$ when it was slurried with fly ash IV ("natural"-whole spectrum of particle size). Calculated weighted average from obtained fractional conversions was 52%. The reason why the weighted average is lower than the base case (52 and 67%, respectively) may be that imperfect wet-sieving left fine particles agglomerated with coarse fractions. The general trend was that for the same fly ash loading, the conversion increased with the decreasing particle size of fly ash. An increase of the fly ash loading from 156 to 30 when the finest fraction of fly ash was used (d<20um) resulted in an increase of Ca(OH)$_2$ conversion from 76 to 92%. An increase of fly ash loading from 16 to 25 when coarser fraction was used (45um<d<75um) resulted in an increase of Ca(OH)$_2$ conversion from 42 to 52%.

TABLE II

| | Fractional Characterization of Fly Ash IV | | | | |
|---|---|---|---|---|---|
| Fraction Ca(OH)$_2$ | Particle Diameter [um] | Weight Fraction [%] | Composition$_1$ Ca | Si | Conversion |
| 1 | d ≦ 1251 | 15 | 12 | 63 | 24 |
| 2 | 75 < d ≦ 125 | 13 | 8 | 55 | 28 |
| 3 | 45 < d ≦ 75 | 20 | 9 | 60 | 43 |
| 4 | 20 < d ≦ 45 | 12 | 14 | 67 | 50 |
| 5 | d ≦ 20 | 40$^2$ | 14 | 63 | 77 |
| 6 | 0 < d ≦ 125+ | 100 | 15 | 68 | 67 |

$_1$Weight percent, normalized Energy Dispersion Spectrometry results.
$^2$All losses during wet-sieving assumed for the finest fraction.

Alternate Sources of Silica

Several alternative sources of silica were tested. These included siliceous clays (kaolinite and bentonite) and talc (MgO 4SiOSO$_2$ H$_2$O). Kaolinite of the molecular composition Al$_2$O$_3$ 2SiO$_2$ 2H$_2$O is the principal constituent of kaolin and the most frequently occurring component of clays. Bentonite (montmorillonite clay) of general formula Al$_2$O$_3$ 4SiO$_2$ H$_2$O exists as very fine particles (up to 60% below 0.1 um), which form colloidal solutions with water. Montmorillonite No. 24 (Ward,s Classification) was tested. All samples were slurried for 6 hours at 65° C. at clay loading of 2. Montmorillonite was also tested at loading of 16. The conversions of Ca(OH)$_2$ were 39, 25, and 23% for montmorillonite, kaolinite, and talc, respectively (at loading of 2). At similar slurrying conditions and loading of 2, fly ash I promoted Ca(OH)$_2$ utilization to 28% (fly ash I slurried at 65° C. for 4 hours only). At montmorillonite loading of 16, it increased the conversion to 61%, which was slightly less than fly ash I and fly ash IV. An SEM photograph was taken of the sample of montmorillonite clay No. 24 slurried with reagent grade Ca(OH)$_2$ at loading of 16 for 6 hours at 65° C. The highly irregular particle surface which was observed was reminiscent of the appearance of silicic acid/Ca(OH)$_2$ samples and of the deposit on the surface of the fly ash spheres.

In conclusion, enhanced performance of spray dryer/bag filter systems with recycle of fly ash an calcium solids is probably due to the reaction of Ca(OH)$_2$ with fly ash to produce calcium silicates. The calcium silicate solids were found to have greater surface area than the unreacted Ca(OH)$_2$ and are more effective for gas/solid reactions. Moreover, calcium silicates were found to be more reactive than aluminates or ferrites The available silica content of the fly ash is more important. Increased time and temperature gave more reactive solids from the reaction of lime and fly ash and solids formed above 65 were substantially more reactive than solids formed at lower temperatures.

Experiments with silicic acid and fly ash support the hypothesis that the reaction of added Ca(OH)$_2$ and silica from fly ash is responsible for the enhancement of Ca(OH)$_2$ utilization when slurried with fly ash, as compared with the utilization of lime alone. The newly formed solids are of high surface area and are highly hydrated. Prior to the formation of highly reactive solids of calcium silicate hydrates two steps apparently need to take place: Ca(OH)$_2$ dissolution and digestion of silica from the fly ash. Since Ca(OH)$_2$ dissolution is very fast compared with fly ash dissolution, digestion of silica from fly ash seems to be the rate controlling step. This was confirmed by experiments with silicic acid, precipitated silica, and precipitated calcium silicate. However, the high price of precipitated silica ($750-1750/ton) make it noneconomic. Therefore enhanced calcium silicate hydrate formation should be sought by carefully selecting slurrying conditions rather than using costly additives.

Experiments showed that increasing slurrying time and temperature can dramatically enhance the utilization of Ca(OH)$_2$ At each temperature the Ca(OH)$_2$ utilization asymptoted to a specific maximum value with increasing time. The time needed to achieve the maximum utilization varied and was generally higher for lower slurrying temperatures. A step increase of reactivity was observed between solids slurried at 55 and 65° C. It took 15 hours to converge on 80% conversion of Ca(OH)$_2$ at 65° C.

When lime was slurried with fly ash and calcium sulfite or calcium sulfate the formation of ettringite was observed. The addition of calcium sulfite/sulfate enhanced utilization when slurried at 25° C. at the fly ash/lime/calcium salt weight ratio of 16:1:14. The effect was dramatic when calcium sulfate was used.

Experiments with clays as an alternate source of silica proved that they also may be effective in the formation of calcium silicate hydrates. Montmorillonite performed as well as fly ash at a loading of 2. At high loading it was only slightly less effective. The use of clays in the place of fly ash offers the advantage of uncontaminated by-product fly ash.

Also from the above presented results it becomes clear that fly ash TAMO (total alkaline metal oxide content) has no decisive effect on the removal of $SO_2$ in the spray dryer when slurried alone, the recycle of spray dryer/bag filter off-product provides the opportunity for unspent $Ca(OH)_2$ to be reacted with fly ash in addition to providing the unspent $Ca(OH)_2$ with another chance to see and react with $SO_2$, enhancing the reaction of $Ca(OH)_2$ with fly ash in the recycle system should improve the overall performance of the spray dryer/bag system.

The advantage of highly reactive solids may be fully utilized in a commercial unit after optimization of the recycle conditions. Presently it is commercial practice to design the recycle tank for about 2 hours residence time. At ambient temperature or adiabatic conditions the effect of heat evolving when warm spray dryer solids are added is negligible. As shown by the results of this study, it would be preferred to increase the size of recycle tank up to 6 hours, preferably even 8 hours. The temperature of the slurry should preferably not be lower than 65° C. to take advantage of a steep change in a reactivity of solids. One option to provide the necessary amount of heat would be to add fly ash directly to the CaO slaker. The recycle tank should be designed carefully to avoid problems with plugging from reaction products and excessive deposit built-up on the walls.

It is possible that the spray dryer could be operated with wider approach to the saturation temperature because more reactive solids would be sprayed. Additional increase of $Ca(OH)_2$ reactivity in the fly ash-$Ca(OH)_2$ system might be possible with deliquescent salt additives. Sand bed studies showed the increase of $Ca(OH)_2$ reactivity when calcium and sodium salts were used. Sodium and calcium salts are widely used as cement retarders and by analogy they should work well also in the fly ash system.

The lab scale experiments also indicate that dry injection of solids into the duct should be accompanied by humidification of the gas. High humidification could be used in installations with ElectroStatic Precipitators (ESP). One option is that the dry solids would be produced outside the system and then injected into the duct and later humidified. Second is that the reacted slurry of fly ash and lime would be introduced into spray dryer operating at wide approach to the saturation. This spray dryer would operate as dryer and absorption of $SO_2$ would be of secondary concern. Spray dryer-dry solids would be then passed into the duct where they would contact humidified gas. Dry injection in the system with ESP requires additional laboratory studies of the rates of reaction at short times.

The idea of producing the reactive solids could be also retrofitted into existing desulfurization installations. It should be feasible for example to collect the product solids from Limestone Injection Multistage Boiler (LIMB), slurry them at favorable conditions and redistri bute. The typical product of LIMB is CaO, $CaSO_4$, and fly ash at the ratio of 3:1:2, which could be simulated in sand bed reactor.

Still another possibility would be Slurry Atomization into Multistage Burner (SAMB) which would consist of spray drying of lime/fly ash slurry at burner temperatures and collecting the dry solids in either ESP or bag filter after additional humidification in the duct.

EXAMPLE II

The Effect of NaOH Addition to the Slurry

It has also been observed that the addition of sodium hydroxide to the slurry serves to potentiate the slurry,s sulfur-adsorbing capability, possibly due to the increased formation of calcium silicates and aluminates at more alkaline pH's. In FIG. 12, about 1 part $Ca(OH)_2$ was slurried at 65° C. for 6 hours with 4 parts fly ash and 4 parts $CaSO_3$, but without the addition of NaOH. $SO_2$ removal (moles $SO_2$/100 moles $Ca(OH)_2$) ranged from about 20, when solids were reacted with gas at about 65° C., to about 10, when reacted with gas at about 92° C.

When 0.03M NaOH was added to a level of 10 mole %, the $SO_2$ removal ranged from about 22, when reacted with gas at 65° C., to about 10, when reacted with gas at about 105°. When 0.08M NaOH was added after the slurry was slurried for 6 hours, and then dried an additional 30 hours in the presence of the added NaOH, the $SO_2$ removal increased to a range of about 58, when reacted with gas at 65° C., to about 30, when reacted with gas at about 92° C., and to about 22, when reacted with gas at about 125.C. When this concentration of NaOH was slurried for only 4 hours, the $SO_2$ removal observed ranged from about 64, at 65° C., to about 20, at 92° C. A longer slurrying time prior to NaOH addition gave similar results. The addition of 0.25 M NaOH demonstrated only slight improvement over control. However, in all cases, it was observed that the addition of NaOH to the slurry improved $SO_2$ removal efficiency.

EXAMPLE III

High Calcium Fly Ash

Lab scale experiments were conducted in order to demonstrate the heat-induced activation of slurries of high calcium fly ash alone without the inclusion of additional calcium (lime). Reactive solids were prepared by slurrying fly ash in a temperature controlled, stainless steel beaker. The solution was sparged for 30 minutes prior to reagent addition to remove $CO_2$ and $O_2$. The NaOH concentration was adjusted using 5 N NaOH. Three types of fly ash, ranging from 4 to 30% CaO (Table ***, were used in the experiments. The solids were slurried at either 65 or 85° C. and the usual water to solids ratio was 20 to 1.

TABLE III

| Fly Ash Characterization by Energy Dispersive Spectroscopy | | | |
|---|---|---|---|
| Fly Ash: | Clinch River | Craig Station | Laramie River |
| Operator: | Appalachian Power Co. | Colorado Ute | Basin Electric |
| Coal Type: | bituminous | subituminous | subituminous |
| Sample Date | 10/86 | 7/85 | 12/86 |
| Composition (wt %) | | | |
| CaO | 4 | 12 | 30 |
| $Al_2O_3$ | 27 | 25 | 17 |
| $SiO_2$ | 57 | 55 | 35 |
| FeO | 8 | 4 | 6 |

Solids reactivity experiments were conducted in a packed bed reactor designed to simulate bag filter conditions essentially as shown in FIG. 2. A pyrex reactor (4 cm in diameter and 12 cm in height) was wrapped with heating tape, and the temperature was controlled within 1° C. Flue gas was synthesized byc obmining $N_2$, $CO_2$, and $SO_2$ from gas cylinders with house air. Water was added to teh system by a syringe pump and evaporated at 120 to 150° C. in a stainless steel evaporation chamber before being mixed with teh gas stream.

Tubing upstream of the reactor was heated to prevent condensation. A PI controller was used to regulate the gas temperature to within 2° C. The reactor was equipped with a bypass to allow for preconditioning of the solids and to allow the gas concentration to stabilize before starting the experiment. After the reactor the gas was cooled and the water condensed out by cooling water. A gas sample of 2.5 ml/min was diluted with 2 1/min of air and then analyzed by a flame photometric $SO_2$ analyzer (Columbia Scientific Model SA28SE). The $SO_2$ concentration was continuously recorded and the concentration curve was integrated to determine solids reactivity.

The experimental conditions for the packed bed reactor system were chosen to simulate conditions of a fabric filter downstream from a cool side dry FGD process. The synthetic flue gas flow rate was 4.61/min (0° C., 101 KPa) with 7% $O_2$, 10% $CO_2$, and the balance nitrogen. The reactor temperature was 66° C. and the $SO_2$ concentration was 450 ppm. Water was injected at 12 mol% to give a relative humidity of 55%. The reagent was sieved through a 115 mesh screen and dispersed in 40 g of 100 mesh (average) silica sand to avoid channeling caused by agglomeration. Before each experiment the solids were preconditioned at 98% relative humidity (2.161/min $N_2$ at 66° C.) for 8 minutes and for 10 more minutes at 55% relative humidity (4.61/min $N_2$ at 66° C.). After this preconditioning, the solids were exposed to synthetic flue gas for 1 hours.

Experiments were conducted with the high and low calcium fly ashes shown above in Table III to evaluate the feasibility of producing reactive solids without the use of $Ca(OH)_2$. The fly ashes were slurried without $Ca(OH)_2$ for 12 hours at 85° C. FIG. 10 shows that the high calcium fly ash could be activated to produce solids reactive towards $SO_2$. The solids were as reactive, on a weight basis (mmol $SO_2$ removed/g sorbent), as the solids prepared by slurrying low calcium fly ash with $Ca(OH)_2$. On a weight basis, the low and medium calcium fly ash solids were much less reactive than the high calcium fly ash solids. In particular, high calcium fly ash could be activated to remove about 1.3 mmol $SO_2$/g sorbent, which is about as reactive as the solids prepared by slurrying low calcium fly ash with $Ca(OH)_2$ at a fly ash loading of 4 (1.44 mmol $SO_2$/g sorbent. However, the utilization of the calcium in the fly ash decreased with the increasing calcium content of fly ash.

There was an optimum NaOH concentration for the high calcium fly ash slurries which is similar to that observed for the low calcium fly ash-$Ca(OH)_2$ slurries, with NaOH concentration ranges of about 0.05 M to about 0.25 M being the most preferred. Moreover, slurry analysis data indicated that the level of dissolved calcium concentration is the reason for the optimum NaOH concentration. In particular, the solids were most reactive when they were formed in the presence of 10 to 100 ppm of dissolved calcium.

Further studies were undertaken using a bench scale sand bed reactor similar to that shown in FIG. 2, to compare the $SO_2$ sorbent capability of activated versus non-activated high calcium fly ash. Fly ash was obtained from Otter Tail Power Company,s Hoot Lake Station which burns lignite. The fly ash analysis shown below in Table IV indicates that the Hoot Lake ash contains 24% CaO and 21% $SiO_2$. Thus, it is apparent that no excess $SiO_2$ is available.

Basecase tests were undertaken using untreated Hoot Lake fly ash in the sand bed reactor at 60% relative humidity and 500 ppm inlet $SO_2$ concentration. Very little $SO_2$ removal was obtained. The average $SO_2$ was only about 0.18 mmole/g.

Following the basecase tests, a series of tests were conducted with normal hydrated Hoot lake fly ash with hydration time as the main variable. FIG. 11 shows that significant enhancement of Hoot Lake fly ash reactivity was obtained by normal hydration of 90° C. (●). The $SO_2$ capture of hydrated Hoot Lake fly ash ranged from 0.9 to 1.3 mmole/g which was considerably higher than the 0.1s mmole/g of unhydrated fly ash. FIG. 11 also indicated that a hydrated time of less than 60 minutes was needed to fully enhance the reactivity.

Another run was made to pressure hydrate the Hoot Lake fly ash at 150° C. for 120 minutes and a 1.39 mmole/g $SO_2$ capture was obtained. The data show that pressure hydration can effectively enhance the reactivity of Hoot Lake fly ash.

TABLE IV

| Typical fly ash sample analytical results (all number in weight percent) | |
|---|---|
| | Hoot Lake (High Calcium) |
| CaO | 24 |
| $SiO_2$ | 21 |
| $Al_2O_3$ | 22 |
| $Na_2O$ | 16 |
| MgO | 6.3 |
| $K_2O$ | 1.5 |
| $Fe_2O^3$ | 4.9 |
| $TiO_2$ | 0.4 |
| Others ($SO_3$, $CO_2$ ...) | 3.9 |

The foregoing studies demonstrated that the reactivity of high calcium fly ash could be enhanced by atmospheric hydration at 90° C. as well as pressure hydration of 150° C. The untreated high calcium fly ash (containing about 24 wt. % CaO) could absorb approximately 0.16 mmole $SO_2$/g at 60¢ relative humidity with one hour residence time in the sand bed. After a high calcium fly ash samle was subjected to hydration for 60 minutes, the reactivity increased to about 1.0 mmole $SO_2$/g.

Three additional runs were conducted to evaluate the effects of hydration temperature on the reactivity of high calcium fly ash. As shown in FIG. 11, with 60 minutes hydration at 50° C. (△), the $SO_2$ capture was in the range to 0.681 mmole $SO_2$/g of fly ash. When the fly ash was hydrated at room temperature (X), the reactivity was only about 0.5 mmole/g. It is apparent that hydration temperature significantly influenced the reactivity of high calcium fly ash.

Two runs were made to evaluate the effect of hydration on the reactivity of law calcium (5.2% CaO) fly ash. Data displayed in FIG. 11 (□) showed that the untreated law calcium fly ash resulted in a reactivity of approximately 0.1 mmole $SO_2$/g. After 120 minutes hydration at 90° C., the reactivity of low calcium fly ash remained at about 0.11 mmole $SO_2$/g. It was concluded that the reactivity of law calcium fly ash cannot be enhanced by atmospheric hydration.

What is claimed is:

1. A process for reducing the level of sulfur dioxide in a sulfur dioxide-containing gas, comprising the steps of:
   (a) preparing an aqueous slurry comprising a calcium alkali together with a calcium-reactive silica or alumina, the calcium alkali and calcium-reactive silica or alumina being introduced into the slurry in a form consisting essentially of a high clacium fly ash, which are present in amounts sufficient to allow for the formation of a sulfur dioxide-absorbing component which includes a calcium silicate or calcium aluminate;
   (b) heating the slurry to a temperature between about 50° and 200° C. for between about 0.1 and about 24 hours to faciliate in the formation of the sulfur dioxide-absorbing component;
   (c) contacting the gas with the slurry in a manner sufficient to allow for the absorption of sulfur dioxide by the absorbing component; and
   (d) separating the absorbing component in the form of spent solids from the gas.

2. The process of claim 1 wherein the slurry if heated to between about 70° and about 150° C. for between about 0.2 and about 24 hours.

3. The process of claim 1 wherein the slurry is heated to between about 90° and about 150° C. for between about 0.2 and 6 hours.

4. The process of claim 1 wherein the fly ash comprises greater than at least about 15% CaO or $Ca(OH)_2$ by weight.

5. The process of claim 1 wherein the fly ash comprises at least about 20% CaO or $Ca(OH)_2$ by weight.

6. The process of claim 1 wherein the fly ash comprises at least about 30% CaO or $Ca(OH)_2$ by weight.

7. The process of claim 1 wherein the slurry comprises an amount of high calcium fly ash such that between about 1 and about 4 moles of calcium are included in the slurry for every mole of sulfur to be removed from the gas.

8. The process of claim 1 wherein the slurry comprises an amount of high calcium fly ash such that between about 2 and about 3 moles of calcium are included in the slurry for every mole of sulfur to be removed from the gas.

9. The process of claim 1 wherein the slurry further comprises sodium hydroxide in a concentration ranging from about 0.02 M to about 0.5 M.

10. The process of claim 1 wherein the slurry further comprises sodium hydroxide in a concentration ranging from about 0.05 M to about 0.25 M.

11. The process of claim 1 wherein step (c) comprises:
    (a) atomizing the slurry into a stream of sulfur dioxide containing gas;
    (b) drying the resulting atomized droplets so as to form a gas/solid suspension having a gaseous component and a solid component which includes the sulfur dioxide-absorbing component; and
    (c) retaining the gaseous and solid components in contact in a manner sufficient to allow for the absorption of sulfur dioxide by the absorbing component.

12. The process of claim 11 further comprising directing the gas/solid suspension onto a reaction surface to allow for deposition of the solid component onto the surbace; and passing the suspension over the deposited solid component to further effect the absorption of sulfur dioxide by the absorbing component and to effect a separation of the gas from the solid component.

13. The process of claim 12 wherein the reaction surface comprises a bagfilter.

14. The process of claim 11 further comprising carrying the gas/solid suspension in a stream to allow for substantial contact between the gaseous and solid component and separating the solid component from the gas by means of an electrostatic precipitator or cyclone.

15. The process of claim 1 further comprising recycling a portion of the spent solids to the aqueous slurry.

16. A process for reducing the level of sulfur dioxide in a sulfur dioxide-containing gas, comprising the steps of:
    (a) preparing an aqueous slurry comprising a calcium alkali together with a calcium-reactive silica of alumina, the calcium alkali and calcium-reactive silica or alumina being introduced into the slurry in a form consisting essentially of a high calcium fly ash, which is present in an amount sufficient to allow for the formation of a sulfur dioxide-absorbing component which includes a calcium silicate or calcium aluminate;
    (b) heating the slurry to between about 50 and 200° C. for between about 0.1 and 48 hours;
    (c) atomizing the slurry into a stream of the sulfur dioxide-containing gas;
    (d) drying the resulting droplets so as to form a gas/solid suspension having a gaseous component and a solid component which includes a sulfur dioxide-adsorbing component;
    (e) retaining the gas/solid suspension in a stream to allow for the absorption of sulfur dioxide by the absorbing component; and
    (f) removing the sulfur dioxide from the gas by separating the solid component from the gaseous component.

17. A process for reducing the level of sulfur dioxide in a sulfur dioxide-containing gas, comprising the steps of:
    (a) preparing an aqueous slurry comprising a calcium alkali together with a calcium-reactive silica of alumina, the calcium alkali and calcium-reactive silica or alumina being introduced into the slurry in a form consisting essentially of a high calcium fly ash, which is present in an amount sufficient to allow for the formation of a sulfur dioxide-absorbing component which includes a calcium silicate or calcium aluminate;
    (b) heating the slurry to a temperature between 50° and 200° C. to facilitate in the formation of the sulfur dioxide-absorbing component;
    (c) drying the slurry to provide a solid component which includes the sulfur dioxide-absorbing component;
    (d) conditioning the gas to a relative humidity of between about 20 and 80% and a temperature of between about 100° and 30° C;
    (e) contacting the conditioned gas with the solid component for a period of time sufficient to allow absorption of gaseous sulfur dioxide by the solid component; and
    (f) separating the solid component, in the form of sulfur-dioxide-absorbed solids, from the gas.

18. The process of claim 17 wherein the temperature of the humidified gas is between about 60°) and 90° C.

* * * * *

UNITED STATES PATENT AND TRADEMARK OFFICE
CERTIFICATE OF CORRECTION

PATENT NO.   :   5,047,222          Page 1 of 8
DATED        :   September 10, 1991
INVENTOR(S)  :   Rochelle et al.

It is certified that error appears in the above-identified patent and that said Letters Patent is hereby corrected as shown below:

Please remove all drawings and insert in their place the drawings enclosed herewith.

In claim 1, column 23, line 12, delete "clacium" and insert therefor --calcium--.

In claim 1, column 23, line 19, delete "faciliate" and insert therefor --facilitate--.

In claim 2, column 23, line 25, delete "if" and insert therefor --is--.

In claim 12, column 23, line 68, delete surace" and insert therefor --surface--.

Signed and Sealed this

Twelfth Day of May, 1992

Attest:

DOUGLAS B. COMER

*Attesting Officer*     *Acting Commissioner of Patents and Trademarks*

United States Patent [19]

Rochelle et al.

[11] Patent Number: 5,047,222
[45] Date of Patent: * Sep. 10, 1991

[54] PROCESS FOR REMOVING SULFUR FROM SULFUR-CONTAINING GASES: HIGH CALCIUM FLY-ASH

[75] Inventors: Gary T. Rochelle, Austin, Tex.; John C. S. Chang, Cary, N.C.

[73] Assignee: Board of Regents, The University of Texas System, Austin, Tex.

[*] Notice: The portion of the term of this patent subsequent to Feb. 14, 2006 has been disclaimed.

[21] Appl. No.: 449,089

[22] Filed: Dec. 8, 1989

Related U.S. Application Data

[63] Continuation of Ser. No. 156,856, Feb. 17, 1988, abandoned, which is a continuation-in-part of Ser. No. 939,171, Nov. 10, 1986, abandoned, and Ser. No. 928,337, Nov. 17, 1986, Pat. No. 4,804,521.

[51] Int. Cl.$^5$ .......................... B01J 8/00; C01B 17/00
[52] U.S. Cl. .................................... 423/242; 423/244
[58] Field of Search .......... 423/242 A, 242 R, 244 A, 423/244 R

[56] References Cited

U.S. PATENT DOCUMENTS

| | | | |
|---|---|---|---|
| 3,131,024 | 4/1964 | Leineweber | 23/110 |
| 3,264,130 | 8/1966 | Mays et al. | 106/292 |
| 3,861,935 | 1/1975 | Ohnemuller et al. | 106/306 |
| 3,906,079 | 9/1975 | Tamaki et al. | 423/242 |
| 3,988,419 | 10/1976 | Mori | 423/155 |
| 4,073,864 | 2/1978 | Atsukawa et al. | 423/242 |
| 4,279,873 | 7/1981 | Felsvang et al. | 423/242 |
| 4,314,980 | 2/1982 | Shen et al. | 423/331 |
| 4,555,392 | 11/1985 | Steinberg | 423/244 |
| 4,602,918 | 7/1986 | Steinberg et al. | 44/51 |
| 4,636,370 | 1/1987 | Dean et al. | 423/235 |
| 4,636,371 | 1/1987 | Farha, Jr. | 423/244 |
| 4,640,825 | 2/1987 | Rosenberg | 423/235 |
| 4,642,225 | 2/1987 | Leikert | 423/244 |
| 4,645,449 | 2/1987 | Schwartz et al. | 431/8 |
| 4,645,652 | 2/1987 | Kimura | 423/235 |
| 4,645,653 | 2/1987 | Kimura | 423/235 |
| 4,645,654 | 2/1987 | Barczak | 423/244 |

FOREIGN PATENT DOCUMENTS

62-213842 9/1987 Japan
396969 8/1933 United Kingdom

OTHER PUBLICATIONS

Jozewicz et al. (1987) Proceedings: Tenth Symposium on Flu Gas Desulfurization, Atlanta, Ga., Nov. 1986, vol. 2, pp. 9-123 through 9-144.
Jozewicz et al., (1986), Environ. Prog., 5:218.
J. He et al., "Comparison of Tuff and Fly Ash in Blended Cement", 64 Am. Ceram. Soc. Bulletin, No. 5 (1985), at 707-711.
G. D. Reed et al., "Analysis of Coal Fly Ash Properties of Importance to Sulfur Dioxide Reactivity Potential", 18 Environ. Sci. Technol., No. 7 (1984), at 548-552.
S. L. Marusin, "Experimental Examination of Fly Ash Concrete", 6 Cement, Concrete, and Aggregates, CCAGDP, No. 6 (Winter 1984), at 126-136.
(List continued on next page.)

Primary Examiner—Gregory A. Heller
Attorney, Agent, or Firm—Arnold, White & Durkee

[57] ABSTRACT

The present disclosure relates to improved processes for treating hot sulfur-containing flue gas to remove sulfur therefrom. Processes in accordance with the present invention include preparing an aqueous slurry composed of a calcium alkali source and a source of reactive silica and/or alumina, heating the slurry to above-ambient temperatures for a period of time in order to facilitate the formation of sulfur-absorbing calcium silicates or aluminates, and treating the gas with the heat-treated slurry components. Examples disclosed herein demonstrate the utility of these processes in achieving improved sulfur-absorbing capabilities. Additionally, disclosure is provided which illustrates preferred configurations for employing the present processes both as a dry sorbent injection and for use in conjunction with a spray dryer and/or bagfilter. Retrofit application to existing systems is also addressed.

18 Claims, 6 Drawing Sheets

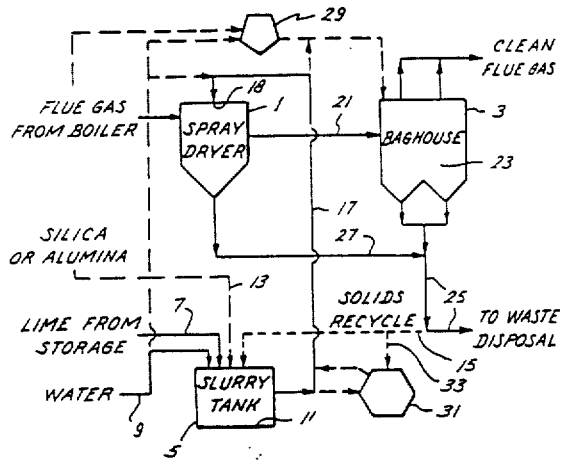

UNITED STATES PATENT AND TRADEMARK OFFICE
CERTIFICATE OF CORRECTION

PATENT NO. : 5,047,222
DATED : September 10, 1991
INVENTOR(S) : Rochelle, et al

It is certified that error appears in the above-indentified patent and that said Letters Patent is hereby corrected as shown below:

On the title page: Item [75] Inventors: add the following: Wojciech Jozewicz, Theodore G. Brna, Charles B. Sedman, Claus Jorgensen.

Signed and Sealed this

Thirteenth Day of February, 1996

Attest:

BRUCE LEHMAN

Attesting Officer  Commissioner of Patents and Trademarks